US008818399B2

(12) United States Patent
Siomina et al.

(10) Patent No.: US 8,818,399 B2
(45) Date of Patent: Aug. 26, 2014

(54) METHODS AND NODES IN A WIRELESS COMMUNICATION NETWORK

(75) Inventors: Iana Siomina, Solna (SE); Ari Kangas, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 0 days.

(21) Appl. No.: 13/021,927

(22) Filed: Feb. 7, 2011

(65) Prior Publication Data

US 2011/0207477 A1 Aug. 25, 2011

Related U.S. Application Data

(60) Provisional application No. 61/308,141, filed on Feb. 25, 2010.

(30) Foreign Application Priority Data

Oct. 5, 2010 (WO) ................. PCT/SE2010/051071

(51) Int. Cl.
*H04W 24/00* (2009.01)
*H04W 56/00* (2009.01)
*H04B 17/00* (2006.01)
*G01S 5/10* (2006.01)
*G01S 5/02* (2010.01)
*H04W 28/04* (2009.01)
*H04W 76/00* (2009.01)
*H04W 64/00* (2009.01)
*H04W 4/22* (2009.01)

(52) U.S. Cl.
CPC ............ *H04W 56/006* (2013.01); *H04W 24/00* (2013.01); *H04W 28/04* (2013.01); *H04B 17/0042* (2013.01); *H04B 17/0072* (2013.01); *H04B 17/0047* (2013.01); *H04W 76/007* (2013.01); *H04B 17/0057* (2013.01); *H04W 64/00* (2013.01); *H04W 4/22* (2013.01); *G01S 5/10* (2013.01); *G01S 5/0278* (2013.01)

USPC ................. 455/456.1; 455/456.2; 455/456.5; 455/456.6

(58) Field of Classification Search
CPC . H04W 64/00; H04W 64/003; H04W 64/006; H04W 4/02
USPC ............................................. 455/456.1, 456.2
See application file for complete search history.

(56) References Cited

U.S. PATENT DOCUMENTS

2002/0132624 A1 9/2002 Watanabe et al.
2003/0096622 A1* 5/2003 Moilanen ...................... 455/456

(Continued)

FOREIGN PATENT DOCUMENTS

JP 2002228736 A 8/2002

OTHER PUBLICATIONS

3rd Generation Partnership Program, Nokia (source), "Discussion on RSTD STD Requirements," 3GPP TSG RAN WG4 (Radio) AdHoc, R4-100082, Sophia Antipolis, FR, Jan. 18-22, 2010.

(Continued)

*Primary Examiner* — Mazda Sabouri
(74) *Attorney, Agent, or Firm* — Coats & Bennett, P.L.L.C.

(57) ABSTRACT

A first network node and method in the first network node in a wireless communication network for enabling quality estimation of a measurement that is time based. The method comprises performing a timing measurement based on a signal received from a second network node. Also, a value of a channel characteristic for the signal received from the second network node is determined. Further, the determined value of the channel characteristic is associated with the timing measurement, such that quality estimation of the timing measurement is enabled.

Further, a method in a positioning node, a positioning node, a method in a module and a module are presented.

20 Claims, 12 Drawing Sheets

(56) References Cited

U.S. PATENT DOCUMENTS

| | | | |
|---|---|---|---|
| 2003/0220117 A1* | 11/2003 | Duffett-Smith et al. | 455/456.6 |
| 2007/0183335 A1* | 8/2007 | Pietraski et al. | 370/241 |
| 2010/0002642 A1* | 1/2010 | Ito | 370/329 |
| 2010/0240396 A1* | 9/2010 | Zhang et al. | 455/456.1 |
| 2010/0311437 A1* | 12/2010 | Palanki et al. | 455/456.1 |
| 2011/0065457 A1* | 3/2011 | Moeglein et al. | 455/456.6 |
| 2012/0302254 A1* | 11/2012 | Charbit et al. | 455/456.1 |

OTHER PUBLICATIONS

3rd Generation Partnership Program, Nortel (source), "Discussions on UE Positioning Issues," 3GPP TSG RAN WG1 Meeting #57, R1-091911, San Francisco, CA, US, May 4-8, 2009.

3rd Generation Partnership Program, "Technical Specification Group Radio Access Network; Evolved Universal Terrestrial Radio Access (E-UTRA); LTE Positioning Protocol (LPP)(Release 9)," 3GPP TS 36.355 V9.2.1 (Jun. 2010).

3rd Generation Partnership Program, Alcatel-Lucent (source), "System Configuration of OTDOA," 3GPP TSG RAN WG1 Meeting #57, R1-092142, San Francisco, CA, US, May 4-8, 2009.

3rd Generation Partnership Program, Huawei (source), "Impact of RSTD STD on Positioning Performance," 3GPP TSG RAN WG4 Meeting #54, R4-100516, San Francisco, CA, US Feb. 22-26, 2010.

3rd Generation Partnership Program, Ericsson (source), "RSTD Measurement Quality," 3GPP TSG RAN WG4 Meeting #54, R4-100571, San Francisco, CA, US, Feb. 22-26, 2010.

Lakhzouri, Abdelmonaem, "Channel Estimation and Mobile Phone Positioning in CDMA Based Wireless Communication Systems," Tampere University of Technology, Dept. of Information Technology, pp. 1-91, Jun. 3, 2005.

\* cited by examiner

METHODS AND NODES IN A WIRELESS COMMUNICATION NETWORK

RELATED APPLICATIONS

This application claims priority to U.S. Provisional 61/308,141 filed Feb. 25, 2010, and PCT/SE2010/051071 filed Oct. 5, 2010.

TECHNICAL FIELD

The present disclosure relates in general to signal measurements in a wireless communication network and in particular to a wireless network architecture that utilizes the quality of signal measurements for multiple nodes for positioning, location and location-based services.

BACKGROUND

The possibility of identifying the geographical location of a target node, such as e.g. a user terminal in a wireless network, has enabled a large variety of commercial and non-commercial services, such as e.g. navigation assistance, social networking, location-aware advertising, emergency calls, etc. Different services may have different positioning accuracy requirements imposed by the application. In addition, some regulatory requirements on the positioning accuracy for basic emergency services exist in some countries, i.e., Federal Communications Commission (FCC) Enhanced 911 (E911) in USA.

In many environments, the position of a node may be estimated by using positioning methods based on Global Positioning System (GPS). In some networks, Assisted-GPS positioning (A-GPS) may be employed to assist user terminal in order to improve the terminal receiver sensitivity and GPS start-up performance. GPS or A-GPS receivers, however, may not be available for all user terminals. Furthermore, GPS may sometimes fail when the target node is situated in indoor environments and/or urban canyons. A complementary terrestrial positioning method, called Observed Time Difference of Arrival (OTDOA), has therefore been standardized by 3rd Generation Partnership Project (3GPP).

With OTDOA, a terminal measures the timing differences for downlink reference signals received from multiple distinct locations. For each measured neighbour cell, the user terminal measures Reference Signal Time Difference (RSTD), which is the relative timing difference between the neighbour cell and a reference cell. The user terminal position estimate may then be obtained as the intersection of hyperbolas corresponding to the measured RSTDs. At least three measurements from geographically dispersed base stations with a good geometry may be used to solve for two coordinates of the user equipment and the receiver clock bias. In order to solve for position, precise knowledge of the transmitter locations and transmit timing offset is needed. Position calculation may be conducted, for example, by a positioning server, such as an Evolved Serving Mobile Location Centre (E-SMLC) in Long Time Evolution (LTE), or the user terminal. The former approach corresponds to the terminal-assisted positioning mode, whilst the latter corresponds to the terminal-based positioning mode.

To enable positioning in LTE and to facilitate positioning measurements of a proper quality for a sufficient number of distinct locations, new physical signals dedicated for positioning, such as e.g. Positioning Reference Signals (PRS), have been introduced and low-interference positioning subframes have been specified in 3GPP.

PRS are transmitted from one antenna port (R6) according to a pre-defined pattern. A frequency shift, which is a function of Physical Cell Identity (PCI) may be applied to the specified PRS patterns to generate orthogonal patterns and modelling the effective frequency reuse of six, which makes it possible to reduce neighbour cell interference on the measured PRS and thus improve positioning measurements. Even though PRS have been specifically designed for positioning measurements and PRS in general may be expected to have better signal quality than other reference signals, the standard does not mandate using PRS. Other reference signals, e.g., Cell-specific Reference Signals (CRS) could in principle also be used for positioning measurements.

Since for OTDOA positioning PRS signals from multiple distinct locations need to be measured, the user equipment receiver may have to deal with PRS that are much weaker than those received from the serving cell. Furthermore, without the approximate knowledge of when the measured signals are expected to arrive in time and what is the exact PRS pattern, the user terminal would need to do signal search within a large window which would impact the time and accuracy of the measurements as well as the user terminal complexity. To facilitate user terminal measurements, the network transmits assistance data to the user terminal, which includes, among the others, a neighbour cell list with PCIs, the number of consecutive downlink subframes, PRS transmission bandwidth, etc.

To facilitate position calculation and estimate the quality of positioning measurements, some quality metric for positioning measurements, which are RSTD in LTE, may be an advantage. The estimated quality may then be delivered to the network element which uses this information, such as the positioning node in the network in the case of user terminal-assisted positioning. The positioning node may in LTE comprise, for example, an E-SMLC and/or the user-plane positioning node SUPL Location Platform (SLP), or a base station or Radio Network Controller (RNC) in some other systems, etc. The estimated quality may however also be delivered to the terminal or derived and used by the terminal itself, e.g., in the case of terminal-based positioning.

Using standard deviation of measurements as a measurement quality metric is very common in the research literature. It has also been standardized for other systems, e.g. Universal Terrestrial Radio Access (UTRA), although the OTDOA-like positioning method in UTRA has not been used yet in real networks. Furthermore, the approach has some practical issues discussed later, which reveals a need of an alternative approach and motivates the importance of the disclosed solution.

As standardized for UTRA in [3GPP TS 25.331], for each measured cell in a plurality of cells comprising the reference and measured neighbour cells, the user terminal obtains the "user terminal positioning OTDOA quality" information which comprises e.g. the information shown in Table 1.

TABLE 1

| User Equipment positioning OTDOA quality in UTRA | | |
|---|---|---|
| Information Element/ Group name | Type and Reference | Semantics description |
| Std Resolution | Bit string(2) | Std Resolution field includes the resolution used in Std of OTDOA Measurements field. Encoding on two bits as follows: |

TABLE 1-continued

User Equipment positioning OTDOA quality in UTRA

| Information Element/ Group name | Type and Reference | Semantics description |
|---|---|---|
| | | '00'  10 meters |
| | | '01'  20 meters |
| | | '10'  30 meters |
| | | '11'  Reserved |
| Number of OTDOA Measurements | Bit string(3) | The 'Number of OTDOA measurements' field indicates how many OTDOA measurements have been used in the UE to determine the sample standard deviation of the measurements. Following 3 bit encoding is used: |
| | | '001'  5-9 |
| | | '010'  10-14 |
| | | '011'  15-24 |
| | | '100'  25-34 |
| | | '101'  35-44 |
| | | '110'  45-54 |
| | | '111'  55 or more |
| | | Special case: |
| | | '000': In this case the field 'Std of OTDOA measurements' contains the std of the reported SFN-SFN std value = $\sqrt{E[(x-\mu)^2]}$, where x is the reported value and $\mu = E[x]$ is the expectation value (i.e. the true value) of x. This std may be used irrespective of the number of measurements and reporting of the number of measurements is not needed. Also other measurements such as Ec/No or Rx levels may be utilised in this case to evaluate the 'Std of OTDOA measurements' reported in this IE. |
| Std of OTDOA Measurements | Bit string(5) | Std of OTDOA Measurements field includes sample standard deviation of OTDOA measurements (when number of measurements is reported in 'Number of OTDOA measurements field') or standard deviation of the reported SFN-SFN otd value = $\sqrt{E[(x-\mu)^2]}$, where x is the reported value and $\mu = E[x]$ is the expectation value (i.e. the true value) of x (when '000' is given in 'Number of OTDOA measurements' field). Following linear 5 bit encoding is used: |
| | | '00000'  0 - (R*1-1) meters |
| | | '00001'  R*1 - (R*2-1) meters |
| | | '00010'  R*2 - (R*3-1) meters |
| | | ... |
| | | '11111' R*31 meters or more where R is the resolution defined by Std Resolution field. E.g. R = 20 m corresponds to 0-19 m, 20-39 m, . . . , 620 + m. |

OTDOA measurement quality in LTE and the signalling means for it are currently under active discussions in 3GPP. In 3GPP TS 36.355; E-UTRA; LTE Positioning Protocol (LPP), the details of the RSTD quality metric are not yet specified.

One of the proposals has been to adopt the UTRA specification for E-UTRAN with a minor change in the "std Resolution" parameter definition to allow resolutions of 5, 10, 20, and 30 meters. Rather than use absolute quality testing, another proposal is to adapt a method used for testing Channel Quality Indicator (CQI) reporting, i.e., in a given, e.g. fixed, condition determine the reported median value and determine that the sufficient amount of reports fall within a predetermined range. It has been observed that standard deviation is not very appropriate in practice as a quality metric because it is not be measured directly and therefore it has been proposed to remove the means for its signalling from LTE Rel. 9.

The previously existing solutions may be split into the following three groups:
1) solutions that drop the quality metric;
2) solutions using a relative quality metric reflecting the quality of reports but not the absolute quality of measurements; and
3) solutions using measurement standard deviation as a quality metric.

Solutions that drop the quality metric have the following disadvantages:
1) In positioning, it is typically not only the position that needs to be estimated, but also the uncertainty of the position estimate needs to be provided, e.g., according to FCC requirements or when ensuring positioning quality of service, and the RSTD measurement quality is necessary for both, i.e., for the position estimate and its uncertainty.
2) The network needs some information to sort out unreliable measurements reported by the user terminal and select the combination of cells with the best geometry for inclusion in position calculation to achieve better position estimate for the user terminal.

Solutions that use a relative quality metric have the following drawbacks:
1) User terminal positioning reports must follow pre-defined formats which would become impossible with CQI-type reporting quality testing since the absolute measure of RSTD error is necessary to estimate the position error in absolute units.
2) The pre-defined formats and the absolute measure of the position estimate are also required by FCC.
3) Only the formats with absolute uncertainty information may be given a Quality of Service (QoS).
4) The reported RSTD quality is to be used, for example, by the network for selecting the appropriate set of cells for inclusion in position calculation where one of the criteria is the measure of the absolute quality of RSTD which allows for selecting cells with a larger relative error when its absolute value is still acceptable.

Solutions using measurement standard deviation as a quality metric have at least the following practical problems:
1) For any statistical characterization of a measurement, the size of the sample set must be sufficiently large, which may be hard to achieve for PRS due to e.g. large periodicity.
2) Since the standard deviation characterizes the deviation of a random variable around its expected value, the metric is not well suited when the reported measurement is not the algebraic average, but, for example, moving average.

There is, therefore, an increasing need and desire for improvements in measuring timing signals for positioning, and for reducing errors and uncertainties in relation to such measurements.

SUMMARY

It is therefore an object to obviate at least some of the previously described disadvantages and to provide a mechanism for improving the performance in a wireless communication network.

According to a first aspect, the object is achieved by a method in a first network node for enabling quality estimation of a measurement that is time based. The first network node and a second network node are comprised in a wireless communication network. The method comprises performing a timing measurement based on a signal received from the second network node. Further, the method comprises determining a value of a channel characteristic for the signal received from the second network node. Also, in addition, the method comprises associating the determined value of the channel characteristic with the timing measurement, such that quality estimation of the timing measurement is enabled.

According to a second aspect, the object is achieved by a first network node configured for enabling quality estimation of a measurement that is time based. The first network node and a second network node are comprised in a wireless communication network. The first network node comprises a processor. The processor is configured to perform a timing measurement based on signals received from the second network node. Further, the processor is also configured to determine a value of a channel characteristic for signals received from the second network node. Additionally, the processor is further configured to associate the determined value of the channel characteristic with the timing measurement, such that quality estimation of the timing measurement is enabled.

According to a third aspect, the object is achieved by a method in a positioning node. The method aims at enabling quality estimation of a measurement that is time based. The positioning node and a first network node are comprised in a wireless communication network. The method comprises receiving a timing measurement and an associated channel characteristic value and/or quality metric value from the first network node. Thereby, positioning of the first network node is enabled, based on the received timing measurement and the associated channel characteristic value and/or quality metric value.

According to a fourth aspect, the object is achieved by a positioning node. The positioning node is configured for enabling quality estimation of a measurement that is time based. The positioning node and a first network node are comprised in a wireless communication network. The positioning node comprises a receiver configured to receive via a logical link or direct wireless or wired link. The receiver is further configured to receive a timing measurement and an associated channel characteristic value and/or quality metric value from the first network node. Thereby the positioning of the first network node is enabled, based on the received timing measurement and the associated channel characteristic value and/or quality metric value.

According to a fifth aspect, the object is achieved by a method in a module in a wireless communication network for obtaining a quality function by relating a value of a channel characteristic with a quality metric value such that a quality metric value may then be associated with a timing measurement. The quality function may be obtained in an off-line manner e.g. by simulations or test beds, or on-line manner, e.g. by collecting statistics in a live network. The method comprises obtaining the timing measurements by the first network node for signals transmitted by the second network node and obtaining the timing measurement error and a channel characteristic value for each of the obtained timing measurement. The timing measurement may, e.g., be a time of arrival measurement or RSTD which in turn may be a single measurement or may be obtained from two time-of-arrival measurements. The method further comprises obtaining the timing measurements error by comparing the corresponding timing measurement and a reference timing measure, where the reference timing measure may, e.g., be obtained as a linear function of a distance measure for the transmitting and receiving nodes, i.e., the first and the second nodes. The distance measure may e.g. be the distance between the first and the second nodes, when e.g. the corresponding timing measurement is time of arrival. The distance measure may also comprise the difference between two distances, the distance between the first node and the second node and/or the distance between the first node and another second node, when the corresponding timing measurement is e.g. RSTD. The distance measures may e.g. be obtained with GPS receivers. The method further comprises associating the channel characteristic with the corresponding timing measurement and defining a quality function for a quality metric that reflects the relationship between the channel characteristic and the timing measurement error, where a function may e.g. be a mathematical function, pre-defined mapping or a set of systematically tabulated values.

According to a sixth aspect, the object is achieved by a module in a wireless communication network for obtaining a quality function by relating a value of a channel characteristic with a quality metric value. The values are associated with a timing measurement. The module comprises a processor. The processor is configured to obtain a reference timing measure for signals received from second network nodes. Further, the processor is also configured to obtain timing measurements by the first network node for signals transmitted by the second network nodes. In addition, the processor is further configured to compute a timing measurement error and at least one value of a channel characteristic for each obtained timing measurement, based on the difference between the reference timing measure and the obtained timing measurements. Furthermore, the processor is also configured to associate the channel characteristic with the corresponding timing measurement, and to define a quality function for a quality metric that reflects the relationship between the channel characteristic and the timing measurement error.

Herein, a connection between any network nodes may comprise e.g. a logical connection such as e.g. a connection via higher-layer protocols through one or more network nodes, or a physical connection such as e.g. a direct connection via wires.

Embodiments of the methods and apparatuses described in the current disclosure apply to timing measurements performed on either downlink or uplink signals.

Embodiments of the present methods provide reduced uncertainties and errors when estimating terminal position, thanks to the herein disclosed new quality metric for timing-based measurements.

Further, embodiments of the present methods provide a simple and straightforward two-way test of mapping a correlator output to the quality metric. Thereby dynamic optimization of the positioning measurement process is facilitated, leading to an improved positioning QoS. Thus the performance of positioning in the wireless network is improved.

According to some embodiments, the first network node may receive a plurality of signals from a plurality of distinct second network nodes. However, some of these signals may be distorted, obstructed, reflected and received via multiple paths, and/or interfered by other signals and may therefore be unreliable when using them as a base for positioning computations. Thanks to embodiments of the present method, the positioning may be performed with higher accuracy, as the most unreliable timing measurements may be neglected or given a lower weight when computing the position. Thereby is an improved performance in a wireless communication network achieved.

Other objects, advantages and novel features will become apparent from the following detailed description.

BRIEF DESCRIPTION OF THE DRAWINGS

Embodiments of the present solutions are described in more detail with reference to attached drawings illustrating exemplary embodiments and in which.

DETAILED DESCRIPTION

Figure 1A:
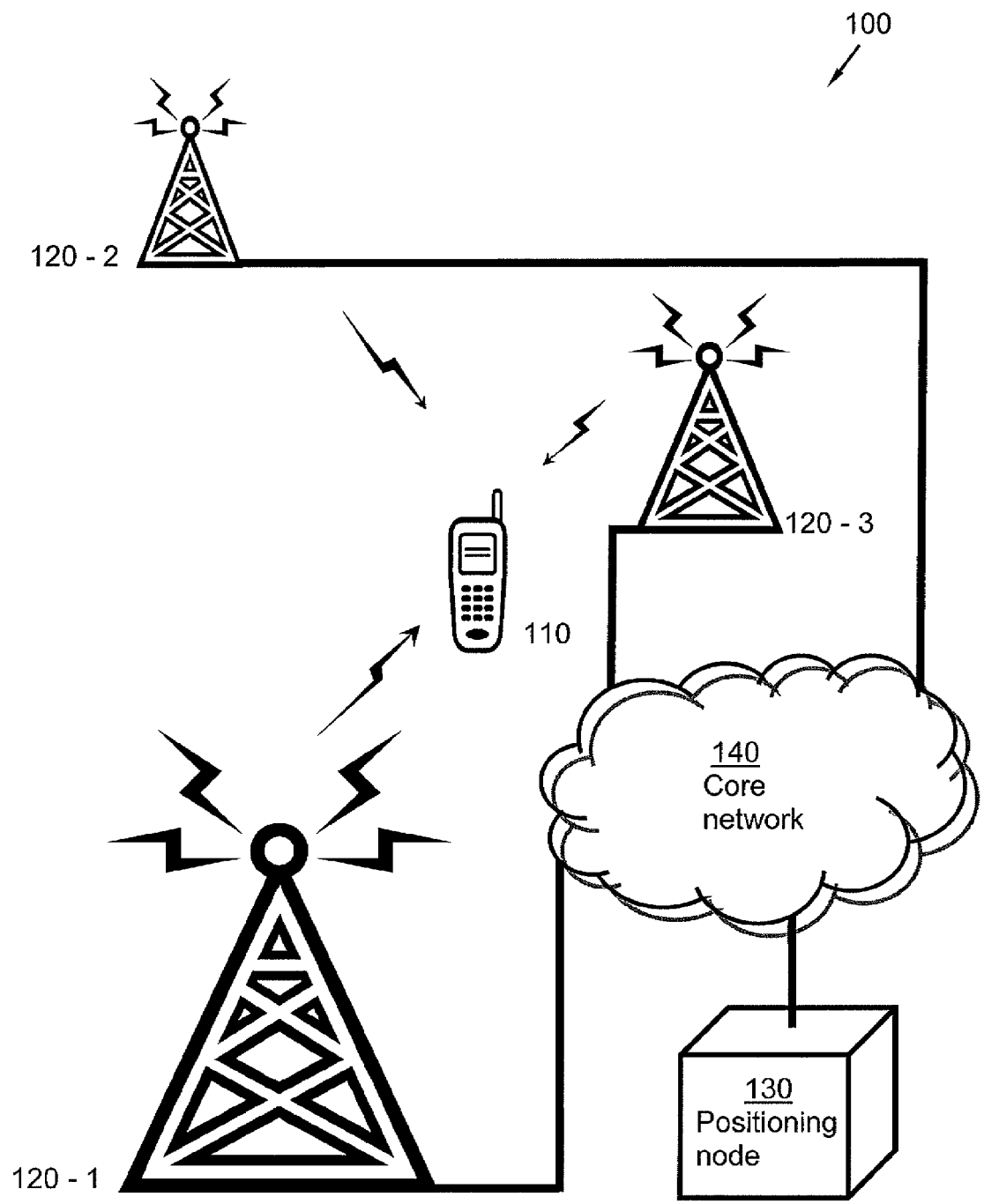
FIG. 1A is a schematic block diagram illustrating a wireless communication network according to some embodiments.

FIG. 1A depicts a wireless communication network 100, based on at least one of such technologies as 3GPP LTE and its evolutions, e.g., LTE-Advanced, but also Evolved Universal Terrestrial Radio Access Network (E-UTRAN), Universal Mobile Telecommunications System (UMTS), Global System for Mobile communications/Enhanced Data rate for GSM Evolution (GSM/EDGE), Wideband Code Division Multiple Access (WCDMA), Worldwide Interoperability for Microwave Access (WiMax), or Ultra Mobile Broadband (UMB), or according to any other wireless communication technology etc, just to mention some few non limiting examples.

The wireless communication network 100 may be configured to operate according to the Time Division Duplex (TDD) and/or the Frequency Division Duplex (FDD) principle, according to different embodiments.

The illustrated exemplary wireless communication network 100 comprises a first network node 110 and three distinct instances of second network nodes 120-1, 120-2, 120-3. The second network nodes 120-1, 120-2, 120-3 are connected, via a core network 140 to a positioning node 130. It is to be noted that the illustrated setting of network nodes 110, 120-1, 120-2, 120-3, 130 is only exemplary. The wireless communication network 100 may comprise further network nodes 110, 120-1, 120-2, 120-3, 130 in any number and combination.

Among any of the three distinct instances of second network nodes 120-1, 120-2, 120-3, only one at the time, and depending on, e.g., the momentary position of the first network node 110, load balancing, etc, may function as a serving node in relation to the first network node 110. Control signalling and data traffic to/from the first network node 110 is transmitted via the serving node. The other instances of the second network node 120-1, 120-2, 120-3, not momentarily functioning as serving node in relation to the first network node 110 may be referred to as neighbour nodes. The serving node may be used as reference node when performing timing measurements, e.g., the timing differences for downlink reference signals received from multiple second network nodes 120-1, 120-2, 120-3 distinct from the serving node. Thereby may a reference timing measure be provided. For each measured neighbour node, the first network node 110 may measure a Reference Signal Time Difference (RSTD) which is the relative timing difference between the measured neighbour node and the reference node.

However, any of the second network nodes 120-1, 120-2, 120-3, not momentarily functioning as serving node may be selected as reference node, according to some embodiments.

Although in the detailed description a single cell is assumed for per node. However, the skilled in the art understands that a node may be in charge of more than one cell where a cell refers to a certain coverage area, and should be able to distinguish embodiments where a cell or a node that may have multiple cells are meant in the text.

The first network node 110 may be represented by e.g., a wireless communication terminal, a user equipment (UE), a mobile station, a mobile cellular phone, a Personal Digital Assistant (PDA), a wireless platform, a laptop, a beacon, a computer or any other kind of device configured to communicate wirelessly with the second network node 120, and/or comprising a processor for calculating the quality metric.

The second network nodes 120-1, 120-2, 120-3 may be represented by, e.g., base stations, Radio Base Stations (RBSs), macro base stations, NodeBs, evolved NodeBs (eNBs, or eNodeBs), base transceiver stations, Access Point Base Stations, base station routers, micro base stations, pico base stations, femto base stations, Home eNodeBs, relays and/or repeaters, sensor, beacon device or any other network node configured for communication or signal transmission over a wireless interface, depending e.g., of the radio access technology and terminology used.

Figure 1B:
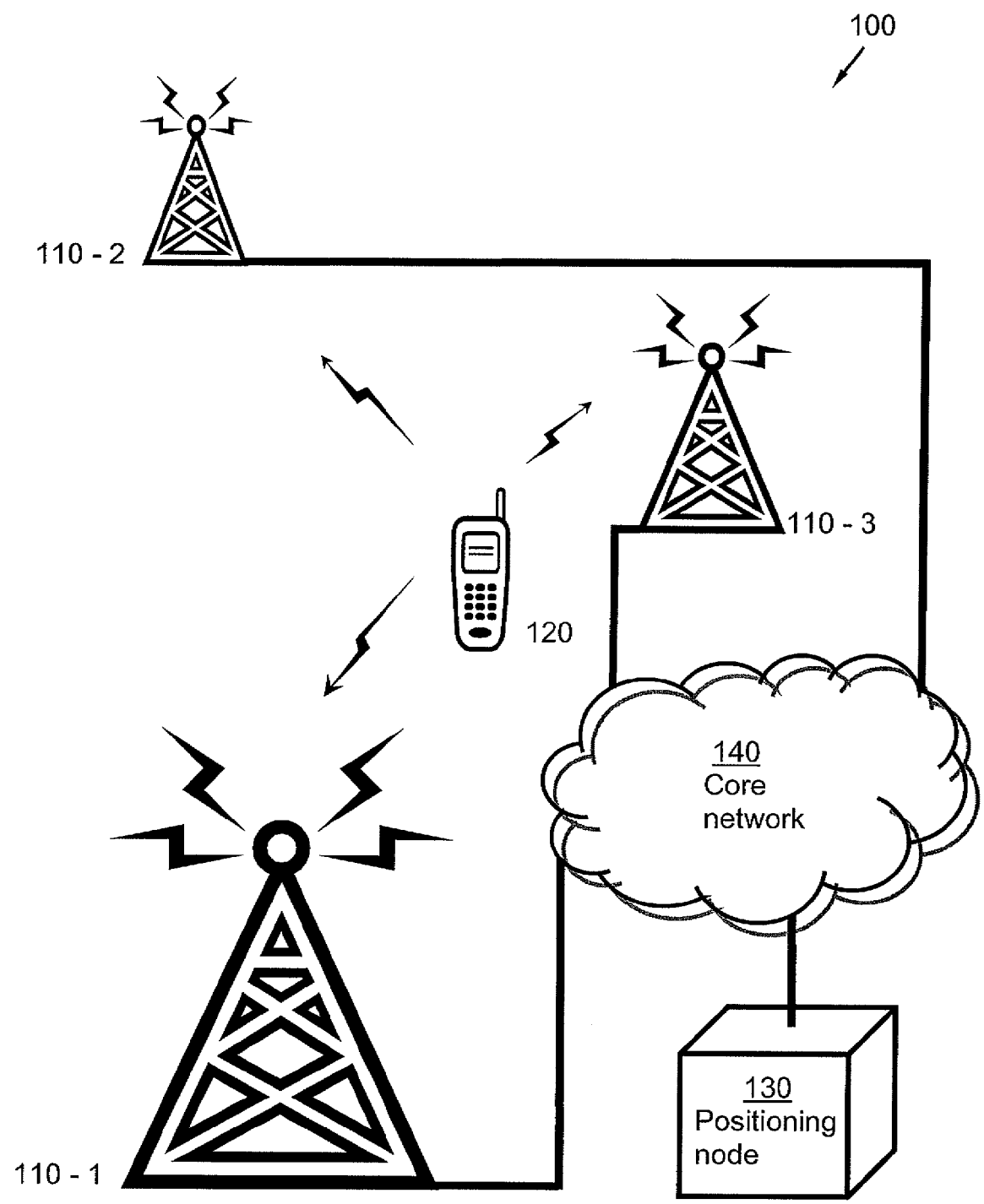
FIG. 1B is a schematic block diagram illustrating a wireless communication network according to some embodiments.

However according to some embodiments illustrated in FIG. 1B, a plurality of first network nodes 110-1, 110-2, 100-3 may be represented by, e.g., a base station, a Radio Base Station (RBS), a macro base station, a NodeB, an evolved NodeB (eNB, or eNodeB), a base transceiver station, an Access Point Base Station, a base station router, a micro base station, a pico base station, a femto base station, a Home eNodeB, a relay and/or a repeater, sensor, beacon device or any other radio node configured for wireless communication over a wireless interface, depending, e.g., of the radio access technology and terminology used. In the subsequent part of the disclosure, the term "first network node" will be used for the first network node 110 in order to facilitate the comprehension of the present embodiments.

Further, according to some embodiments illustrated in FIG. 1B, the second network node 120 may be represented, e.g., by a wireless communication terminal, a user equipment (UE), a mobile station, a mobile cellular phone, a Personal Digital Assistant (PDA), a wireless platform, a laptop, a computer, a small base station or any other kind of device configured to communicate wirelessly within the wireless communication network 100. In the subsequent part of the disclosure, the term "second network node" will be used for the second network node 120, in order to facilitate the comprehension of the present embodiments.

The herein described solutions are elaborated with specific reference to LTE networks. Thus the wireless communication network 100 is described as an LTE system throughout the rest of the disclosure, for enhanced comprehension and readability. However, the corresponding concept may also be applied in other wireless networks 100, based on other radio access technology, such as e.g., the ones previously enumerated.

The wireless communication network 100 thus allows transmission/reception of information using a plurality of network nodes 110, 120, 130. The expression "downlink" (DL) is in the present context used to specify the transmission from the second network nodes 120 to the first network node 110, while the expression "uplink" (UL) is used to denote the transmission from the first network node 110 to the second network nodes 120, when the first network node 110 comprises a user equipment and the second network nodes 120 comprise base stations.

The positioning node 130 may be represented by a positioning server, a Serving Mobile Location Centre (SMLC), an evolved SMLC (E-SMLC), or similar network nodes and/or devices according to some embodiments.

In at least one embodiment, the positioning node 130 may comprise a core network node. In another non-limiting embodiment, the positioning functionality and thus the positioning node 130 may be comprised in the first network node 110, i.e., the terminal when the first network node 110 comprises a terminal configured to perform positioning of itself, e.g., corresponding to user equipment-based positioning. In yet another embodiment, the first network node 110, i.e., terminal may also request positioning of itself and thus the requesting node is an entity comprised within the terminal. The "terminal" herein shall be understood as a non-limiting terminology referring to a device or node being positioned.

Exemplary embodiments relates to the quality of timing-based measurements, or timing measurement, such as e.g., RSTD measurements used for positioning, to the channel characteristics such as delay spread, in order to facilitate measurement quality estimation from which may benefit both the first network node 110 and the second network node 120 when using it, for example, for positioning estimation, measurement process optimization/tuning, and ensuring Quality of Service, QoS. It is to be noted that the expressions timing-based measurements, timing measurements, positioning RSTD measurements and/or RSTD are used in the present disclosure somewhat in parallel.

Embodiments of the present solution may comprise one or more of the following aspects:

1) Defining the quality metric for a timing measurement. The timing measurement may comprise, e.g., RSTD and the uncertainty of the reported RSTD at a given confidence level such that the uncertainty relates at least to some characteristics of the channel;
2) A method for deriving the relation between the quality metric and a channel characteristic is based on at least one of: channel delay spread of a communication channel, measured signal quality or received signal strength, or correlation information of a reference signal, where the correlation information is defined as, e.g., the amount of the received energy measured at the correlator given by a sequence of values $p(\tau_i)$ where i is a relative index from the set of indexes [−Imax, . . . , +Imax] surrounding the selected peak.
3) On-line and off-line ways of building up the relation between the quality metric of a timing measurement and the channel characteristic;
4) Using a previously established relation for estimating the quality of the timing measurement by mapping the channel characteristic and a confidence level to a quality metric value for the timing measurement;
5) Using the quality metric for the timing measurement and confidence level information in position estimation to enhance positioning QoS;
6) Using the quality metric for the timing measurement and confidence level information to facilitate, or improve the accuracy of, positioning measurements;
7) Defining signalling apparatuses for requesting/reporting quality of the timing measurement and confidence level information.

Exemplary embodiments of the present solution may comprise a method of determining the quality of a timing measurement. One exemplary embodiment may comprise measuring the time of arrival of a signal, such as, e.g., a reference signal from a second network node 120, received over a communication channel at a first network node 110; and determining a quality metric for the measured arrival time based on a channel characteristic of the communication channel.

In some embodiments, the quality metric may comprise the uncertainty of the measured arrival time at a given confidence level.

In some embodiments, the quality metric may be determined based on the measured delay spread of the communication channel.

In some embodiments, the measured delay spread of the signal may be estimated based on the correlation peak of the signal.

In some embodiments, the quality metric may be determined based on a quality function that relates the quality metric to the delay spread. Such quality function may be approximated by e.g. a polynomial function, a linear function, or an exponential function. Further, according to some embodiments, may the quality function for one or more confidence levels be stored as a lookup table in memory.

In some embodiments, the measured delay spread may be compensated to account for the presence of a receiver filter.

In some embodiments, the performed timing measurement, such as e.g. an arrival time of the received signal, and quality metric may be used to compute the position of the first network node 110, such as e.g. a user terminal, a base station, or any other network node being positioned.

Other embodiments of the present solution may comprise a first network node 110 configured to determine a quality metric for the measured time of arrival of a positioning reference signal based on a channel characteristic of the communication channel, which positioning reference signal may be received from a second network node 120.

The quality metric for the timing measurement may be defined as the uncertainty of the timing measurement at a certain confidence level. As will be hereinafter described in more detail, the quality metric may be related to a channel characteristic, such as the channel delay spread, which may be estimated based on the correlation peak of the signal received at the first network node 100 from a second network node 120. In some embodiments, the measured delay spread may be compensated to account for the presence of a receiver filter. A quality function may be defined that relates the quality metric to the delay spread. Such quality function may be approximated by a polynomial function, a linear function, or an exponential function. Further, according to some embodiments, may the quality function for one or more confidence levels be stored as a lookup table in memory. In some embodiments, the performed timing measurement may be used to compute the position of the first network node 110, such as e.g., a user terminal, a base station, or any other network node being positioned.

The quality of the timing measurement depends on many factors among which are measured signals configuration (e.g., PRS configuration), channel characteristics, receiver properties, measurement configuration of the first network node 110 (e.g., sequential/parallel/group-parallel measurement), measurement bandwidth, integration time, etc. Trying to find a systematic relation of the timing measurement error as a function of at least the most important of the aforementioned factors is a tedious task. Considering a measure which accounts for these factors jointly may therefore be a more practical approach. Since timing-based measurements are based on the correlator output, one possible solution to the problem may be to find a relation between the obtained correlator output, such some characteristic of the observed correlation peaks, and the timing measurement error, which may reflect the receiver ability to detect the signal and also cope with multipath.

Thereby may an absolute quality metric, reflecting the quality of reports and also the absolute quality of timing measurements be provided, which in a most surprising way may be used according to the present solutions, to improve timing measurements and positioning using timing measurements, as will be further described in detail in the subsequent part of the disclosure.

In its classical definition, the Root Mean Square (RMS) delay spread is the standard deviation value of the delay of reflections, weighted proportional to the energy in the reflected waves and the delay spread may be understood as the channel characteristics isolated from the receiver performance. In embodiments of the current solution, the delay spread concept may be adapted to the correlator output in order to take into account also receiver characteristics, signal properties, measurement configuration of the first network node 110, etc. In particular, the relation between timing measurement error, such as e.g., RSTD error, and the RMS delay dispersion $\tau_{RMS}$ over samples surrounding, on the time axis, the measured timing may be studied.

Consider the measured timing and the closest to it detected correlation power peak. Assume that the peak is centred at zero point. A range I of relative indexes may be defined, with respect to the peak such that I=[−Imax, −(Imax−1), ..., 0, ..., (Imax−1), Imax], where an element of I is an index of a sample with respect to the centre peak.

The RMS correlation power peak delay spread is given by:

$$\tau_{RMS} = \sigma(\tau) = \sqrt{\frac{\sum_{i \in I}(\tau_i - \overline{\tau})^2 p(\tau_i)}{\sum_{i \in I} p(\tau_i)}}$$

where $\tau_i$ is the timing of sample i, $p(\tau_i)$ is the amount of the received energy measured at the correlator and is playing a role of the weighting factor, and $\overline{\tau}$ is the estimated timing of the first correlation peak, which may either be a sample point or may be obtained by interpolation between two neighbour sample points e.g., by finding the centre of gravity according to some embodiments. $\tau_{RMS}$ may be defined for any measured second network node 120, such as e.g., serving node, reference node or neighbour node.

For a given $\tau_{RMS}$ it may be assumed that also the timing measurement error may be obtained. When the timing measurement is RSTD, the timing measurement may be defined as $\Delta = \overline{\tau} - \overline{\tau}_{reference\_cell}$, where the reference node is the second network node 120 with respect to which the timing measurement of a given other second network node 120 is measured. Thus the timing measurement error may be defined as the difference between the timing measure and a reference timing measure. The reference node may be the serving node which is often the best in terms of signal quality and the distance to the first network node 110, but not always, e.g., in a wireless network 100 with closed subscriber groups. For a given $\tau_{RMS}$, timing measurement quality may then essentially be the timing measurement error given by:

RSTD_QUALITY=abs($\Delta - \Delta_{ideal}$), where $\Delta_{ideal} = t - t_{reference\_cell}$, and t and $t_{reference\_cell}$ are the first detected peak timing for the measured network node and the reference node, respectively, assuming the ideal channel knowledge. It is to be understood that when the reference cell signal quality is not very good, the channel quality for the reference cell may also be taken into account, since in the RSTD measurement, unlike with the ToA measurement, links with two cells, e.g., two channels, are involved. In this case, either two errors are explicitly taken used in the quality function or a single value $\tau_{RMS}$ is used which may either take into account the dominating error or be calculated as a statistically combined metric for the involved channels e.g., $$\tau_{RMS} = \sqrt{(\tau_{RMS,reference\_cell})^2 + (\tau_{RMS,neighbor\_cell})^2}.$$

Note that for a reference node, the timing measurement quality is given by:

RSTD_QUALITY$_{reference\_cell}$=abs(
$\overline{\tau}_{reference\_cell} - t_{reference\_cell}$)

In one embodiment of the solution, $\tau_{RMS}$ may be compensated for the sampling filter. It may further be noted that in practice even a one tap channel may give a non-zero $\tau_{RMS}$ due to the receiver filter. Thus, some compensation may be an advantage for this fact to achieve a better match between the $\tau_{RMS}$ and the timing measurement quality. For this, one may deconvolve the sampling filter. For a sinc filter, one could, for example, obtain the compensated RMS correlation power peak delay spread, denoted by $\tau_{RMS\_compensated}$, as follows, $$\tau_{RMS\_compensated} = \sqrt{\tau_{rms}^2 - \tau_{onetap}^2}$$

where:

$$\tau_{onetap} = \sigma(\tau) = \sqrt{\frac{\sum_{i \in I}(\tau_i - \overline{\tau})^2 \text{sinc}^2((\tau_i - \overline{\tau})\pi/T_S)}{\sum_{i \in I} \text{sinc}^2((\tau_i - \overline{\tau})\pi/T_S)}}$$

In signal processing, a sinc filter is an idealized filter that removes frequency components above a given bandwidth, leaves the low frequencies alone, and has linear phase. The filter's impulse response is a sinc function in the time domain, and its frequency response is a rectangular function.

In one embodiment, given the confidence level, the relation between the delay spread and the timing measurement error may be approximated by a polynomial function, which may be found by fitting to, for example, simulated or measured results. The function may further be referred to as a timing measurement quality function, or RSTD quality function. Different confidence levels may have different timing measurement quality functions. In one embodiment of the solution, the timing measurement quality function may comprise a linear function. Note that the timing measurement quality function may be given, for example, in an explicit form or in the form of mapping as will be further discussed later in this disclosure.

If a correlation, e.g., a strong correlation of the quality function with some factors is observed, then the function may be further more specifically defined considering such a factor as an additional input such as e.g., environment type characterized with specific channel behaviour in some specific conditions or local area; measurement bandwidth, capability of the first network node 110, transmitting and/or receiving node type, etc., according to some embodiments.

If some statistical operation is applied to multiple measurements to get one aggregate measure, e.g., a traditional algebraic average or moving average, multiple values of the timing measurements may also be available. In this case, in one embodiment of the solution, the same statistics operation may be applied to the corresponding estimated timing measurement errors.

In some instances, it may be necessary or desirable to interpolate timing between two neighbour samples. In one embodiment, the interpolation of timing for LTE Time Difference of Arrival (TDOA) may be obtained by calculating the centre of gravity for the energy received in two surrounding sample points after the correlator, i.e.

$$\bar{\tau} = \frac{\sum_{j=\{-1,0,1\}} (j_0 + j) \cdot T_s \cdot p(j_0 + j)}{\sum_{j=\{-1,0,1\}} p(j_0 + j)}$$

where $j_0$ is the sample index with the maximum received energy, $T_s$ is the sampling step, and $p(j_0+j)$ is the received energy in sample $j_0+j$ after the correlator.

A number of approaches may be used to build a quality function for a quality metric that relates a channel characteristic to a time measurement error. The timing measurement quality function may be obtained on-line or off-line. On-line fitting may be conducted in a real wireless communication network 100, for example, during a training period, by collecting and using statistics from first network nodes 110 for which geographical positions are known, e.g., equipped with GPS receivers. Off-line fitting may be obtained, for example, by simulations or test measurements. With the on-line fitting the function parameters may be defined by the wireless communication network 100, whilst with the off-line fitting the function parameters may be obtained off-line and then either configured in the wireless communication network 100 or hard coded in network elements, such as e.g., the first network node 110, the second network node 120, the positioning node 130, user equipment or eNB, to mention some options.

A timing measurement quality function for each specified confidence level may thus be built up following an on-line or off-line approach, or a combination of these approaches. The quality function may be given by either tabulating or explicitly specifying the function, according to different embodiments. The quality function may be configured or hard-coded in at least some network elements such as e.g., the first network node 110, the second network node 120 or the positioning node 130 for each supported combination of $\tau_{RMS}$ and $P_l$.

The mapping process may assume that the timing measurement quality function, i.e. the function describing the relation between the timing measurement quality metric and the power peak delay spread, is known. Let it be denoted by $f(\tau_{RMS}, P)$, where P is the confidence level. Then mapping is the process of obtaining the timing measurement quality metric RSTD_QUALITY, which may be formalized as:

$$\tau_{RMS} \xrightarrow{f(\tau_{RMS}, P)} \text{RSTD\_QUALITY}$$

In case of a polynomial, the function may e.g., be given by a vector of its coefficients $(k_0, k_1, \ldots, k_n)$, where $k_i$ is the constant coefficient for the n-power term. For a linear function, the vector reduces to a vector of two elements $(k_0, k_1)$ and the timing measurement quality function $f(\tau_{RMS}, P)$, which may be specified by a vector of n+2 elements (n=1 for the linear case), is given by:

$$(k_0, k_1, P),$$

which may be hard-coded or configured in any, some or all of the network elements 110, 120, 130. For a set of L confidence levels, a set of L vectors describing the corresponding functions needs to be designed. In this case, the information may, for example, be represented by a matrix, as shown below:

$$\begin{bmatrix} k_{0,0} & k_{0,1} & P_0 \\ \ldots & \ldots & \ldots \\ k_{l,0} & k_{l,1} & P_l \\ \ldots & \ldots & \ldots \\ k_{L-1,0} & k_{L-1,1} & P_{L-1} \end{bmatrix}$$

Given the above matrix and $\tau_{RMS}$, the RSTD_QUALITY may be calculated for any confidence level $P_l$. Another way to specify the relation between $\tau_{RMS}$ and RSTD_QUALITY may be to tabulate the allowed values of $\tau_{RMS}$ with a given resolution and the corresponding values of RSTD_QUALITY for each supported confidence level $P_l$.

In another embodiment of the solution, the mapping format of the timing measurement quality discussed in the current disclosure is adapted to the format of the timing measurement quality metric standardized for UTRA, see Table 1, where the timing measurement uncertainty may be used instead of timing measurement standard deviation, number of measurements/samples could be the number of samples included in the set I and the resolution relates to the confidence level and the correlation peak delay spread.

The quality metric for timing measurements may be used to improve the quality of timing measurements and positioning estimates based on the timing measurements. Different users may have different service subscriptions, different first network nodes 110 may have different capabilities, and different Location Services (LCS) applications may have different positioning quality requirements, which results in different positioning QoS profiles. Timing measurement quality may impact the final positioning quality and depends on many factors, including the time spent for positioning measurements, and measurement configuration such as measured bandwidth, etc. The first network nodes 110 may thus adapt the measurement process to the requested QoS. For example, the first network node 110 may adapt the measurement process by adapting one or more measurement parameters, such as measurement bandwidth, measurement time, number of integrated consecutive subframes and/or the number of positioning occasions, and cell re-grouping when multiple network nodes are measured in parallel for network nodes within a group and sequentially among the groups, etc.

To facilitate adaptation of the measurement process, the first network node 110 may request some reference RSTD quality that corresponds to the requested positioning quality. Standardized RSTD accuracy requirements may be used as a part of the RSTD quality information in the optimization above. A target/reference RSTD quality metric with or without a corresponding confidence level may be defined in association with a QoS profile which, among the others, may also be characterized, for example, by Client Type, service type and/or requested positioning QoS. The QoS profile may be stored, for example, in the second network node 120, in the positioning node 130 or Mobile Management Entity (MME) etc. The target/reference RSTD quality metric and the corresponding confidence level may be used in the optimization above.

The first network node may be able to estimate the RSTD quality that has been achieved or may be achieved with a certain configuration. The outcome of the comparison of the estimated RSTD quality and the reference RSTD quality may serve as a basis for the decision of the first network node 110 to either accept the current configuration or optimize/tune it further to approach the reference RSTD quality.

Depending upon the particular implementation, channel characteristics and/or quality metrics may need to be signalled between network nodes 110, 120, 130 in order to support the corresponding functionality in the wireless communication network 100. The information to be signalled depends on where position calculation and the measurement quality estimation take place and how the RSTD quality information is utilized by the first network node 110 and/or the second network node 120, or the positioning node 130. Depending on the location of the quality estimation and position calculation, the following signalling may be utilized:

- Correlation information such as power peak delay spread as such or a basis for deriving it, signalled from the first network node 110 to the second network node 120, or to the positioning node 130.
- RSTD_QUALITY without the confidence level information, when the latter is known, signalled from the first network node 110 to the second network node 120, or to the positioning node 130.
- RSTD_QUALITY with the corresponding confidence level signalled from the first network node 110 to the second network node 120, or to the positioning node 130.
- RSTD_REFQUALITY without the confidence level information, when the latter is known, signalled from the second network node 120 to the first network node 110.
- RSTD_REFQUALITY with the corresponding confidence level signalled from the second network node 120, or the positioning node 130, to the first network node 110.
- RSTD_REFQUALITY without the confidence level information, when the latter is known, signalled between the network nodes such as e.g., MME and positioning node 130, MME and the second network node 120, the second network node 120 and positioning node 130, E-SMLC and user-plane positioning nodes, etc.
- RSTD_REFQUALITY with the corresponding confidence level signalled between the network nodes such as e.g., MME and positioning node 130, MME and the second network node 120, the second network node 120 and positioning node 130, E-SMLC and user-plane positioning nodes, etc.
- Aggregated RSTD_QUALITY: For each reported RSTD value and a given confidence level, there may be one reported value for estimated RSTD quality obtained by applying the same statistics operation as the one used to obtain the RSTD values.

In the above, RSTD_REFQUALITY is the RSTD reference quality associated a specific positioning QoS. Note that not all the listed signalling means may be used for all network architectures and positioning solutions and for other types of timing measurements. Note also that the signalling means described above do not require using the RSTD quality metric described in the present disclosure, but may be adapted for any quality metric, comprising those that have been standardized for other systems such as e.g., RSTD standard deviation. Furthermore, the proposed signalling is not limited to RSTD only but may be used for any timing-based measurements.

In LTE network, the positioning node 130 may comprise an E-SMLC in the control plane, or SLP as a user-plane positioning node that communicates with E-SMLC over a standardized or proprietary interface. In this case, the channel characteristics or quality information may be communicated, for example, over the following protocols: LTE Positioning Protocol (LPP) between first network node 110 and the positioning node 130, LPP Annex (LPPa) between the second network node 120 and the positioning node 130, LCS Application Protocol (LCS-AP) between MME and the positioning node 130.

Figure 2A:
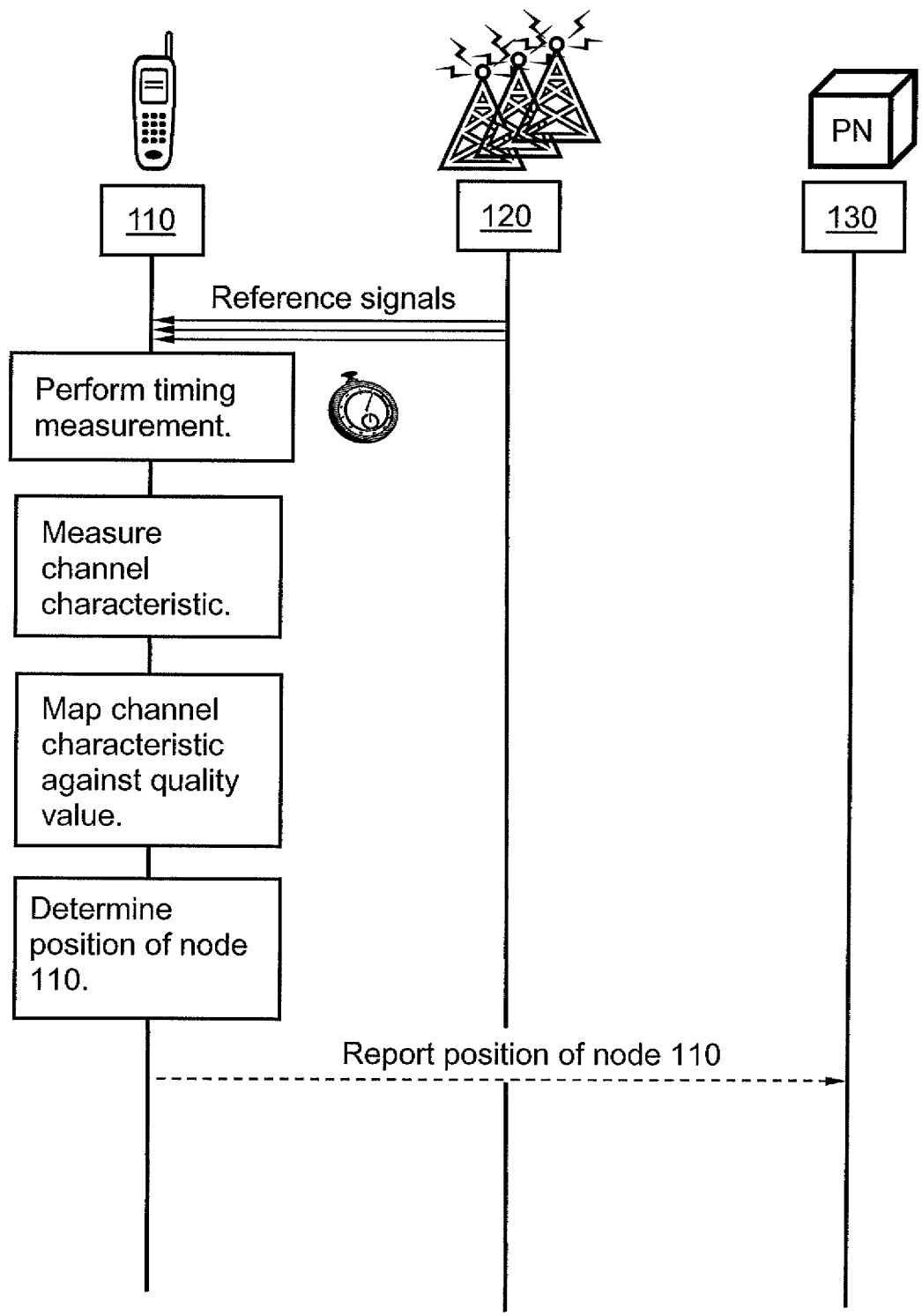
FIG. 2A is a combined flow chart and block diagram illustrating an embodiment of the present solution.

FIG. 2A is a combined flow chart and block diagram illustrating an exemplary embodiment of the present solution.

The present solution may be exemplified in the following non-limiting descriptions of different embodiments, as illustrated in subsequent FIGS. 2A-2D, which are provided in order to give a general overview of different embodiments of the present solution, as well as to mirror the versatility and multitude of the present solution.

In the embodiment illustrated in FIG. 2A may comprise the following actions:

The first network node 110 receives signals from instances of the second network node 120. In the illustration is three second network nodes 120 schematically illustrated; however, this is to be understood as a non-limiting example only. The signals received from the second network nodes 120 may be reference signals such as e.g., CRS, PRS, or any other appropriate signals which may also be e.g., synchronization signals.

Further, each signal discussed in the present context may comprise one signal, a burst of signals, or a signal/signal burst which is repeatedly transmitted at a certain time interval such as e.g., every 160 ms, just to mention an arbitrary time interval.

For each of the received signals from instances of the second network node 120, the first network node 110 may measure a Reference Signal Time Difference (RSTD), which is the relative timing difference between a signal received from the second network node 120 and the reference node. The reference node may be the serving node; however, this is not necessary. Any of the second network nodes 120 may be capable of acting as serving node and/or reference node.

Further, a value of a channel characteristic for a signal received from the second network node 120 may be determined. The signal may be the same signal as has been used for the timing measurement, or a different signal emitted from the same instance of the second network node 120, such as e.g., a reference signal like CRS, PRS, or any other appropriate signal.

The value of the channel characteristic may comprise delay spread such as channel delay spread of the communication channel, measured signal quality or received signal strength, or correlation information of a reference signal, where the correlation information is defined as e.g., the amount of the received energy measured at the correlator given by a sequence of values $p(\tau\_i)$ where i is a relative index from the set of indexes $[-I_{max}, \ldots, +I_{max}]$ surrounding the selected peak, or any other appropriate measure.

Such other appropriate measure may comprise e.g., Timing Advance (TA), Signal to Interference and Noise Ratio (SINR), or distance, i.e., such that-cells that are within Line Of Sight (LOS) from the first network node 110. The LOS status may be reckoned based on some further calculation, e.g., by comparing the neighbour signal strength, or the interference, with ideal path loss model or possibly use the channel estimation, selecting those "close" ones.

The determined value of a channel characteristic for the signal received from the second network node 120 may then be associated with the timing measurement made on a signal received from that instance of the second network node 120. Thereby is a quality estimation of the timing measurement enabled.

According to some embodiments, the determined value of the channel characteristic may be converted into a quality measure, which in turn may be associated with the timing measurement made on the signal received from the second network node 120. Such conversion of the determined channel characteristic value into a quality metric value may be performed by mapping the determined channel characteristic value against a list of predetermined corresponding quality metric values in a lookup table in a memory, according to some embodiments. However, the conversion of the determined channel characteristic value into a quality metric value may optionally be made by performing a quality function, such as an exponential function, polynomial function or a linear function, that relates the value of the channel characteristic to the quality metric value.

Based on the value of the quality metric that is associated with each timing measurement from the second network nodes 120, the first network node 110 may determine its position, and also a confidence value related to the obtained position estimate according to some embodiments.

The first network node 110 may receive a plurality of signals from a plurality of distinct second network nodes 120. However, some of these signals may be distorted, obstructed, reflected and received via multiple paths, and/or interfered by other signals and may therefore be unreliable when using them as a base for positioning computations. Thanks to the present method, the positioning may be performed with higher accuracy, as according to some embodiments, the most unreliable timing measurements may be neglected or given a lower priority when computing the position.

According to some embodiments, the timing measurements may be sorted in a priority list, based on the respective associated quality metric value. The calculation of the geographical position of the first network node 110 may then be made based on a subset of the timing measurements selected in priority order from the priority list according to a criterion, such as a threshold value.

However, according to some embodiments, the timing measurements with a higher quality metric value may be given higher weights in the position calculation. Thereby the accuracy of the positioning calculations may be further improved, as the timing measurements with a higher probability of being correct, as indicated by the quality metric, may be given more influence in the positioning calculations, while the timing measurements with less probability of being correct is given less influence, while not being completely neglected.

Optionally, according to some embodiments, the first network node 110 may report the computed geographical position of itself to another network node such as e.g., the positioning node 130, or e.g., to a user equipment within the network 100 for providing e.g., a rendezvous service, etc.

Figure 2B:
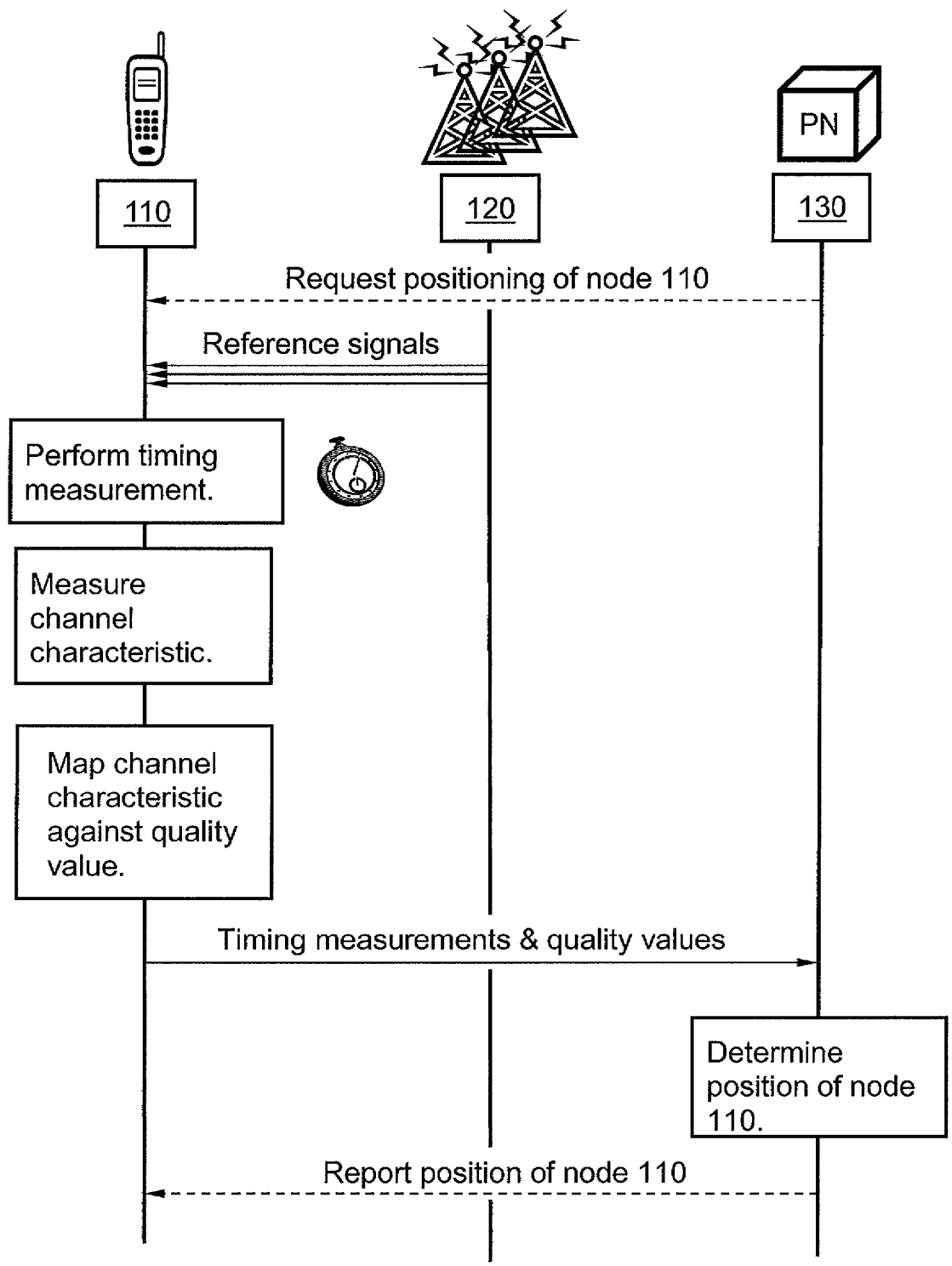
FIG. 2B is a combined flow chart and block diagram illustrating an embodiment of the present solution.

FIG. 2B is a combined flow chart and block diagram illustrating an exemplary embodiment of the present solution.

The embodiment illustrated in FIG. 2B may comprise the following actions:

A request for the position of the first network node 110 may be received, e.g., from the positioning node 130.

The first network node 110 receives signals from second network nodes 120. In the illustration is three distinct instances of the second network node 120 schematically illustrated; however, this is to be understood as a non-limiting example only. The signals received from the second network nodes 120 may be reference signals such as, e.g., CRS, PRS, or any other appropriate signal.

For each of the thus received signals from any second network node 120, the first network node 110 may measure a Reference Signal Time Difference (RSTD), which is the relative timing difference between a signal received from the second network node 120 and the reference node. The reference node may be the serving node; however, this is not necessary. Any of the second network nodes 120 may be capable of acting as serving node and/or reference node. The signal measurement may optionally be triggered by the received positioning request.

Further, a value of a channel characteristic for a signal received from the second network node 120 may be determined. The signal may be the same signal as has been used for the timing measurement, or a different signal emitted from the second network node 120, such as, e.g., a reference signal like CRS, PRS, or any other appropriate signal.

The value of the channel characteristic may comprise delay spread, such as channel delay spread of the communication channel, measured signal quality or received signal strength, or correlation information of a reference signal, where the correlation information is defined as, e.g., the amount of the received energy measured at the correlator given by a sequence of values p(tau_i) where i is a relative index from the set of indexes [−Imax, . . . , +Imax] surrounding the selected peak, or any other appropriate measure.

Such other appropriate measure may comprise, e.g., Timing Advance, Signal to Interference and Noise Ratio, or distance, i.e., such that cells that are within Line Of Sight (LOS) from the first network node 110. The LOS status may be reckoned based on some further calculation, e.g., by comparing the neighbour signal strength, or the interference, with ideal path loss model or possibly use the channel estimation, selecting those "close" ones.

The determined value of a channel characteristic for the signal received from the second network node 120 may then be associated with the timing measurement made on a signal received from that second network node 120. Thereby a quality estimation of the timing measurement may be enabled.

The determined value of the channel characteristic may, according to some embodiments, be converted into a quality measure, which in turn may be associated with the timing measurement made on the signal received from the second network node 120. Such conversion of the determined channel characteristic value into a quality metric value may be performed by mapping the determined channel characteristic value against a list of predetermined corresponding quality metric values in a lookup table in a memory, according to some embodiments. However, the conversion of the determined channel characteristic value into a quality metric value may optionally be made by performing a quality function, such as an exponential function, or a linear function, that relates the value of the channel characteristic to the quality metric value.

The timing measurements and corresponding values of quality metric associated with each timing measurement from the second network nodes 120 may then be transmitted to the positioning node 130. Based on the value of the quality metric and the associated timing measurement may the positioning node 130 determine the geographical position of the first network node 110.

According to some embodiments, the timing measurements may be sorted in a priority list, based on the respective associated quality metric value. The calculating the geographical position of the first network node 110 may then be made based on a subset of the timing measurements selected in priority order from the priority list according to a criterion, such as a threshold value.

However, according to some embodiments, the positioning node 130 may give the timing measurements with higher quality metric value higher weights in the position calculation. Thereby may the accuracy of the positioning calculations be further improved, as the timing measurements with a higher probability of being correct, as indicated by the quality metric, may be given more influence in the positioning calculations, while the timing measurements with less probability of being correct is given less influence, while not being completely neglected.

Optionally, according to some embodiments, the positioning node 130 may report the computed geographical position of the first network node 110 to another network node such as, e.g., the first network node 110 itself, thereby providing a user equipment assisted positioning service.

Figure 2C:
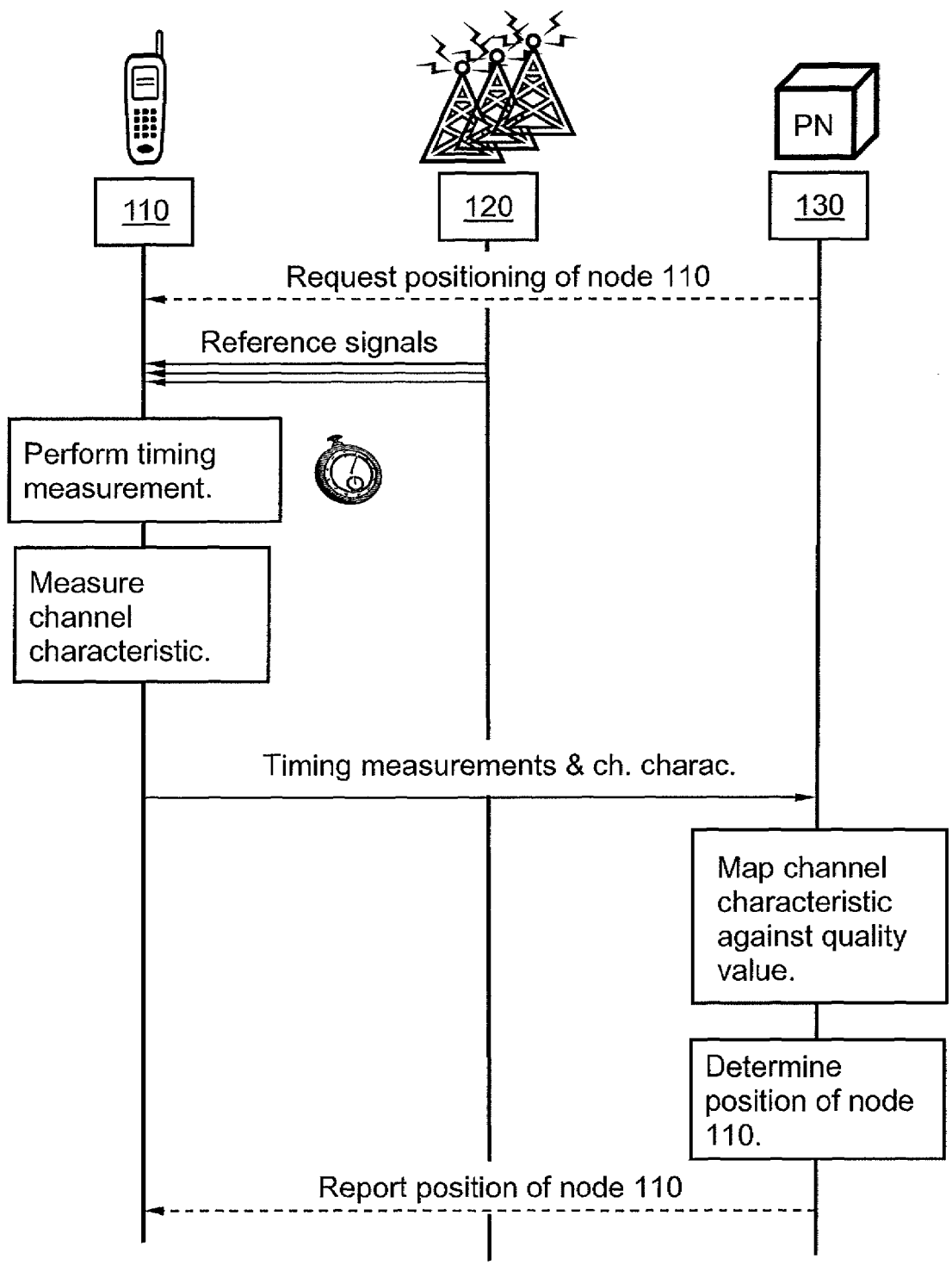
FIG. 2C is a combined flow chart and block diagram illustrating an embodiment of the present solution.

FIG. 2C is a combined flow chart and block diagram illustrating an exemplary embodiment of the present solution. The embodiment illustrated in FIG. 2C may comprise the following actions:

A request for the position of the first network node 110 may be received, e.g., from the positioning node 130.

The first network node 110 receives signals from second network nodes 120. In the illustration is three distinct instances of the second network node 120 schematically illustrated; however, this is to be understood as a non-limiting example only. The signals received from the second network nodes 120 may be reference signals such as, e.g., CRS, PRS, or any other appropriate signal.

For each of the thus received signals from a second network node 120, the first network node 110 may measure a Reference Signal Time Difference, which is the relative timing difference between a signal received from the second network node 120 and the reference node. The reference node may be the serving node; however, this is not necessary. Any of the second network nodes 120 may be capable of acting as serving node and/or reference node. The signal measurement may optionally be triggered by the received positioning request.

Further, a value of a channel characteristic for a signal received from the second network node 120 may be determined. The signal may be the same signal as has been used for the timing measurement, or a different signal emitted from the second network node 120, such as, e.g., a reference signal like CRS, PRS, or any other appropriate signal.

The value of the channel characteristic may comprise delay spread such as channel delay spread of the communication channel, measured signal quality or received signal strength, or correlation information of a reference signal, where the correlation information is defined as, e.g., the amount of the received energy measured at the correlator given by a sequence of values p(taui) where i is a relative index from the set of indexes [−Imax, . . . , +Imax] surrounding the selected peak, or any other appropriate measure.

Such other appropriate measure may comprise, e.g., Timing Advance, Signal to Interference and Noise Ratio, or distance, i.e., such that cells that are within Line Of Sight from the first network node 110. The Line Of Sight status may be reckoned based on some further calculation, e.g., by comparing the neighbour signal strength, or the interference, with ideal path loss model or possibly use the channel estimation, selecting those "close" ones.

The determined value of a channel characteristic for the signal received from the second network node 120 is then associated with the timing measurement made on a signal received from that second network node 120. Thereby is a quality estimation of the timing measurement enabled.

The timing measurements and the associated channel characteristic may then, according to the illustrated embodiment, be transmitted to the positioning node 130.

The determined value of the channel characteristic may, according to some embodiments, be converted into a quality measure by the positioning node 130, which in turn may be associated with the timing measurement. Such conversion of the determined channel characteristic value into a quality metric value may be performed by mapping the determined channel characteristic-value against a list of predetermined corresponding quality metric values in a lookup table in a memory, according to some embodiments. However, the conversion of the determined channel characteristic value into a quality metric value may, optionally, be made by performing a quality function, such as an exponential function, or a linear function, that relates the value of the channel characteristic to the quality metric value.

Based on the value of the quality metric and the associated timing measurement, the positioning node 130 may determine the geographical position of the first network node 110.

According to some embodiments may the timing measurements be sorted in a priority list, based on the respective associated quality metric value. Calculating the geographical position of the first network node 110 may then be made based on a subset of the timing measurements selected in priority order from the priority list according to a criterion, such as a threshold value.

However, according to some embodiments may the positioning node 130 give the timing measurements with a higher quality metric value higher weights in the position calculation. Thereby the accuracy of the positioning calculations may be further improved, as the timing measurements with a higher probability of being correct, as indicated by the quality metric, may be given more influence in the positioning calculations, while the timing measurements with less probability of being correct is given less influence, while not being completely neglected.

Optionally, according to some embodiments may the positioning node 130 report the computed geographical position of the first network node 110 to another network node such as, e.g., the first network node 110 itself, thereby providing a user equipment assisted positioning service.

Figure 2D:
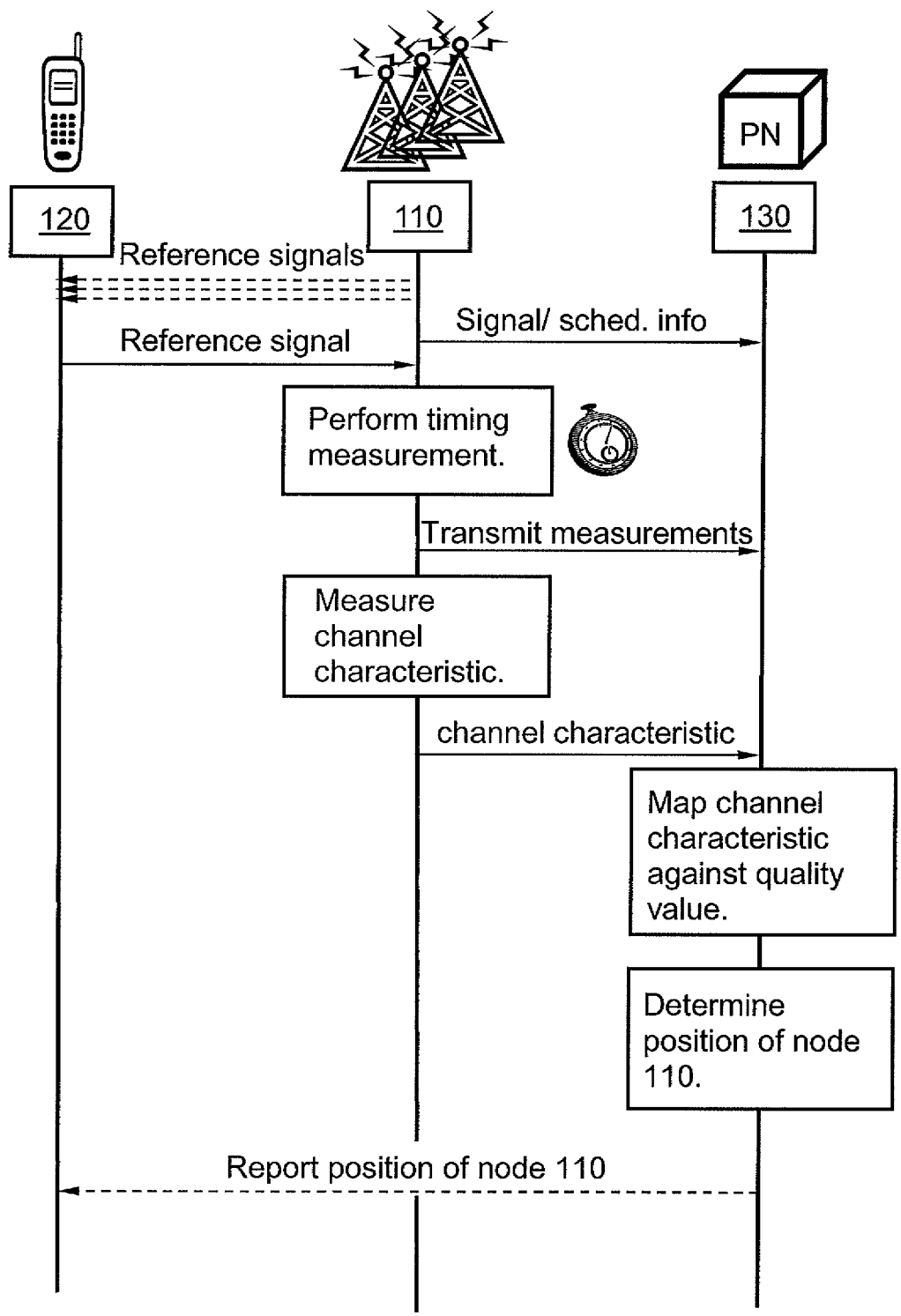
FIG. 2D is a combined flow chart and block diagram illustrating an embodiment of the present solution.

FIG. 2D is a combined flow chart and block diagram illustrating an exemplary embodiment of the present solution.

It is to be noted that in the embodiment illustrated in FIG. 2D, the first network node 110 is represented by a base station, while the second network node 120 is represented by a terminal, i.e., user equipment.

The receivers for signals being measured may be a part of a base station. In another embodiment, these receivers are a part of third nodes. The third network nodes may comprise Location Measurement Units (LMUs) which receive radio signals from the second network node 120, i.e., a terminal, and may perform positioning measurements.

LMUs are radio nodes typically connected with radio base stations and positioning node 130. LMUs receive radio signals from terminals and perform positioning measurements.

They may receive scheduling and the reference signal information, etc., from radio base stations and report measurements to the positioning node 130, according to some embodiments.

Channel characteristics may be measured by LMUs as well, but a solution when channel measurements are performed at base stations, thus being co-located in this case with LMUs, and then communicating channel measurements to LMUs is also possible, according to some embodiments.

Measurements may be reported to the positioning node 130 by either LMUs or base stations in the latter case, and LMUs may communicate the measurements to base stations before the base stations report them to the positioning node 130

LMUs may not always be co-located with eNodeBs, even though in practice it may be common. The interface between base stations and LMUs may be a standardized or proprietary one. In the co-located case, the two nodes may look like a single "box", though the functionality will still be different. A typical timing measurement for uplink measured at LMUs may be time of arrival.

The embodiment illustrated in FIG. 2D may comprise the following actions:

Any, some or all instances of the first network node 110, i.e., base stations, in the wireless network 100 may transmit signal information such as, e.g., reference signal information and/or scheduling information to the positioning node 130. This may be made at any arbitrary moment in time, and may even be performed continuously with a certain interval, according to some embodiments.

The second network node 120, i.e., user equipment, may then transmit a signal such as, e.g., a sounding reference signal, or any other appropriate reference signal. The signal emitted from the second network node 120 may then be received by instances of the first network node 110, which may perform timing measurements based on the received signal, according to some embodiments.

The timing measurements may be, according to some embodiments, sent to the positioning node 130 separately.

Further, a value of a channel characteristic for a signal received from the second network node 120 may be determined. The signal may be the same signal as has been used for the timing measurement, or a different signal emitted from the second network node 120, such as, e.g., a reference signal, a Sounding Reference Signal (SRS), or any other appropriate signal or control or traffic channel.

The value of the channel characteristic may comprise delay spread such as channel delay spread of the communication channel, measured signal quality or received signal strength, or correlation information of a reference signal, where the correlation information is defined as, e.g., the amount of the received energy measured at the correlator given by a sequence of values p(taui) where i is a relative index from the set of indexes [−Imax, . . . , +Imax] surrounding the selected peak, or any other appropriate measure.

Such other appropriate measure may comprise, e.g., Timing Advance, Signal to Interference and Noise Ratio, or distance, i.e., such that cells that are within Line Of Sight from the first network node 110. The Line Of Sight status may be reckoned based on some further calculation, e.g., by comparing the neighbour signal strength, or the interference, with ideal path loss model or possibly use the channel estimation, selecting those "close" ones.

The determined value of a channel characteristic for the signal received from the second network node 120, according to some embodiments, may be associated with the timing measurement made on a signal received from the second network node 120. Thereby a quality estimation of the timing measurement may be enabled.

The timing measurements and the associated channel characteristic according to the illustrated embodiment may be transmitted to the positioning node 130 together, with, or separately from the corresponding timing measurement, according to some embodiments.

The determined value of the channel characteristic may, according to some embodiments, be converted into a quality measure by the positioning node 130, which in turn may be associated with the corresponding timing measurement. Such conversion of the determined channel characteristic value into a quality metric value may be performed by mapping the determined channel characteristic value against a list of predetermined corresponding quality metric values in a lookup table in a memory, according to some embodiments. However, the conversion of the determined channel characteristic value into a quality metric value may optionally be made by performing a quality function, such as an exponential function, or a linear function, that relates the value of the channel characteristic to the quality metric value.

Based on the value of the quality metric and the associated timing measurement may the positioning node 130 determine the geographical position of the second network node 120.

According to some embodiments, the timing measurements may be sorted in a priority list, based on the respective associated quality metric value. The calculation of the geographical position of the second network node 120 may then be made based on a subset of the timing measurements selected in priority order from the priority list according to a criterion, such as a threshold value.

However, according to some embodiments, the positioning node 130 may give the timing measurements with a higher quality metric value higher weights in the position calculation. Thereby the accuracy of the positioning calculations may be improved, as the timing measurements with a higher probability of being correct, as indicated by the quality metric, are given more influence in the positioning calculations while the timing measurements with less probability of being correct are given less influence, while not being completely neglected.

Optionally, according to some embodiments, the positioning node 130 may report the computed geographical position of the second network node 120 to another network node 110, 120 such as, e.g., the second network node 120 itself.

Figure 3:
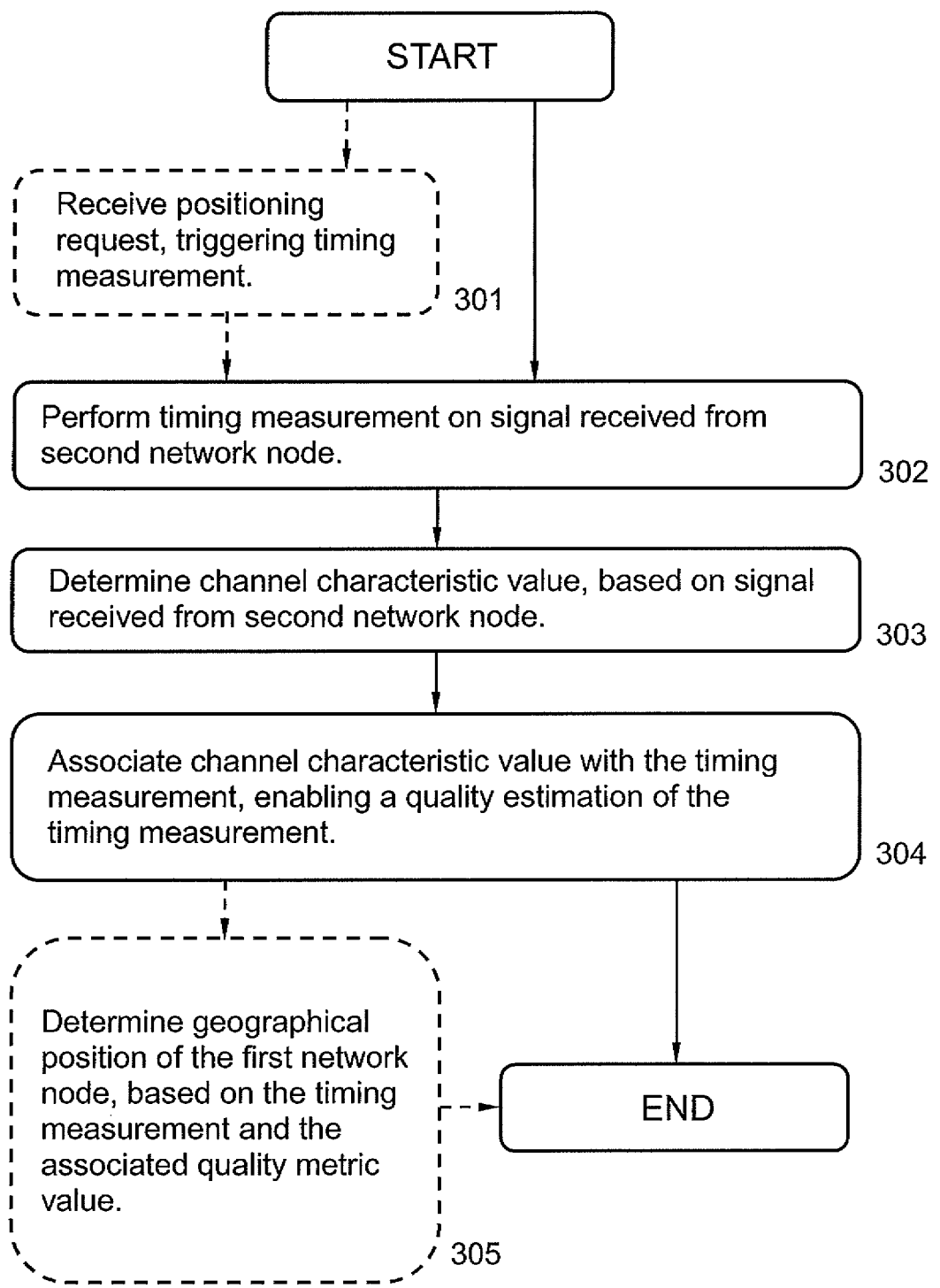
FIG. 3 is a flow chart illustrating an embodiment of the present method in a first network node.

FIG. 3 is a flow chart illustrating embodiments of method actions 301-305 in a first network node 110 for enabling quality estimation of a measurement that is time based. The first network node 110 and a second network node 120 are comprised in a wireless communication network 100. The wireless communication network 100 may be, e.g., an LTE radio network. The first network node 110 may be, e.g., a mobile telephone, a user equipment or a base station according to different embodiments. The second network node 120 may be, e.g., a base station, an eNB, a mobile telephone, or a user equipment according to different embodiments.

The quality estimation of a measurement that is time based may further comprise a confidence level. Thereby measurements with low confidence may be dropped or given a lower priority in position calculation, i.e., similar to the bad quality.

With mapping, a separate mapping table, or separate columns, etc, with quality values may exist for different confidence levels, according to some embodiments.

To appropriately enable quality estimation of a timing measurement, the method may comprise a number of actions 301-305.

It is noted, however, that some of the described actions, e.g., actions 301-305, may be performed in a somewhat different chronological order than the enumeration indicates and that some of them, e.g., actions 301 and 305, are optional.

Further, any, some or all actions, such as e.g., 302 and 303, may be performed simultaneously or in a rearranged chronological order. The method may comprise the following actions:

Action 301

This action is optional and may be performed only within some embodiments.

A positioning request may be received, triggering a timing measurement according to some embodiments.

The optional positioning request may be sent by the positioning node 130, by the second network node 120, or by a user equipment within the wireless network 100.

Action 302

A timing measurement is performed, based on a signal received from the second network node 120.

The timing measurement may be a Reference Signal Time Difference (RSTD) measurement, according to some embodiments. Further, the timing measurement may be based on a Positioning Reference Signal (PRS) from at least one second network node 120.

The RSTD quality may be the most straightforward metric since any other measure, i.e. RSTD as such, signal quality measurements, etc. does not directly reflect the reliability of RSTD measurements, which may be an advantage for timing based measurements.

The timing measurement may be triggered by receiving a trigger, or a positioning request, from another network node, such as the positioning node 130, according to some embodiments.

Action 303

A value of a channel characteristic for a signal received from the second network node 120 is determined. The received signal may be the same signal on which the timing measurement was performed in action 302, or a different signal from the same the second network node 120, according to different embodiments.

The value of the channel characteristic may be based on at least one of: channel delay spread of a communication channel, correlation information of a reference signal and a measured signal quality or received signal strength, correlation information of a reference signal and/or measured signal quality, according to some embodiments.

According to some embodiments, the associated values of the timing measurement and the determined channel characteristic value may be provided to a positioning server 130, enabling the positioning of the first network node 110, based on the timing measurement and the associated channel characteristic value.

The channel characteristic value to be determined on the signal received from the second network node 120 according to some embodiments may be based on at least one of: channel delay spread of the communication channel, correlation information of the signal and the measured signal quality or received signal strength.

According to some embodiments, at least parts of the correlation output may be signalled to the positioning node 130.

According to some embodiments, channel measurement may start together with the timing measurements and according to at least one of the embodiments, the channel estimation may be triggered by the received positioning request.

Action 304

The determined value of the channel characteristic is associated with the timing measurement, such that quality estimation of the timing measurement is enabled.

According to some embodiments, the action may convert the determined value of the channel characteristic into a quality metric value, and associate the quality metric value with the timing measurement.

The quality metric value may be used for determining the timing measurement weight utilized in the position calculation for the first network node 110, according to some embodiments.

According to some embodiments, the associated values of the timing measurement and the determined quality metric value may be provided to a positioning server 130, enabling the positioning of the first network node 110, based on the timing measurement and the associated quality metric value.

The conversion of the determined channel characteristic value into a quality metric value may optionally be performed by mapping the determined channel characteristic value against a list of predetermined corresponding quality metric values in a lookup table in a memory.

However, according to some embodiments, the conversion of the determined channel characteristic value into a quality metric value may be performed by performing a quality function, such as an exponential function, that relates the value of the channel characteristic to the quality metric value.

Thereby a new quality metric for timing-based measurements is achieved, which is applicable even for a single timing measurement.

Action 305

This action is optional and may be performed only within some embodiments.

A geographical position of the first network node 110 may be determined, based on the timing measurement and the associated quality metric value.

According to some embodiments, the action of determining the geographical position of the first network node 110 may comprise to obtain, such as, e.g., perform, a plurality of timing measurements, made on signals received from distinct network nodes 120-1, 120-2, 120-3, each measurement associated with an also obtained quality metric value. Further, the corresponding set of quality metric values may be obtained. In addition, the obtained timing measurements may be sorted in a priority list, based on the respective associated quality metric value. Furthermore, the geographical position of the first network node 110 may be calculated based on a subset of the timing measurements selected in priority order from the priority list according to a criterion.

The criterion may, according to some embodiments, comprise a threshold and the subset of timing measurements may comprise the measurements for which the quality value is on one side of the threshold.

According to some embodiments, the timing measurements with a higher quality metric value may be given higher weights when calculating the position of the first network node 110.

Thereby positioning measurements within the wireless communication network 100 are improved, by eliminating or reducing the impact of unreliable signal timing measurements. Further, dynamic optimization of the positioning measurement process to meet the requested QoS requirements is facilitated.

Figure 4:
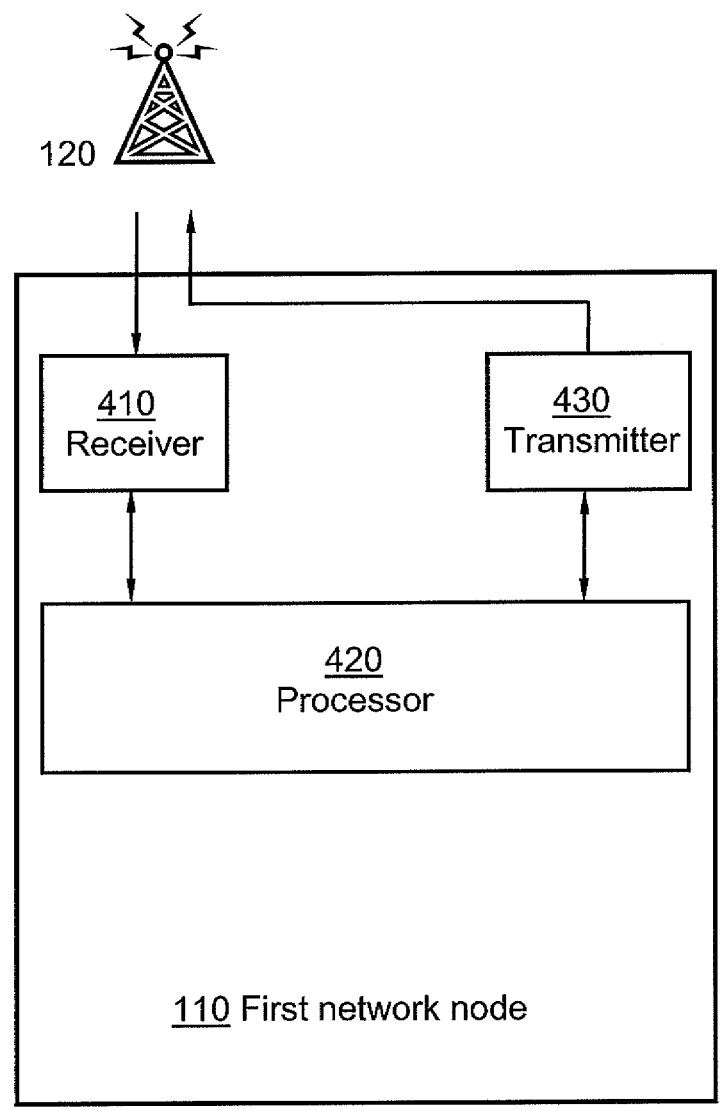
FIG. 4 is a schematic block diagram illustrating a first network node according to some embodiments.

FIG. 4 schematically illustrates a first network node 110. The first network node 110 is configured to perform any, some, or all of the previously described actions 301-305 in order to enable quality estimation of a measurement that is time based. The first network node 110 and a second network node 120 are comprised in a wireless communication network 100. The wireless communication network 100 may be, e.g., a LTE radio network. The first network node 110 may be, e.g., a mobile telephone, a user equipment or a base station according to different embodiments. The second network node 120 may be, e.g., a base station, an eNB, a mobile telephone, or a user equipment according to different embodiments.

In order to perform the actions 301-305 correctly, the first network node 110 comprises a processor 420, configured to perform a timing measurement based on signals received from the second network node 120. The processor 420 is further configured to determine a value of a channel characteristic for signals received from the second network node 120. In addition, the processor 420 is configured to associate the determined value of the channel characteristic with the timing measurement, such that quality estimation of the timing measurement is enabled.

The processor 420 may be represented by, e.g., a Central Processing Unit (CPU), a microprocessor, or other processing logic that may interpret and execute instructions. The processor 420 may perform data processing functions for inputting, outputting, and processing of data comprising data buffering and device control functions, such as call processing control, user interface control, or the like.

Also, the first network node 110 may comprise, according to some embodiments, a receiver 410, that may be configured to receive signals over a radio interface from other nodes, e.g., from the second network node 120, according to some embodiments.

Further, according to some embodiments, the first network node 110 may comprise a transmitter 430. The optional transmitter 430 may be configured to transmit signals to the second network node 120 over a radio interface.

It is to be noted that any internal electronics of the first network node 110 not completely necessary for understanding the present solution according to actions 301-305 has been omitted from FIG. 4, for clarity reasons.

Further, it is to be noted that some of the described units 410-430 comprised within the first network node 110 in the wireless communication network 100 are to be regarded as separate logical entities but not necessarily separate physical entities. To mention just one example, the receiver 410 and the transmitter 430 may be comprised or co-arranged within the same physical unit, a transceiver, which may comprise a transmitter circuit and a receiver circuit, which transmits outgoing radio frequency signals and receives incoming radio frequency signals, respectively, via an antenna. The radio frequency signals transmitted between the first network node 110, and/or the second network node 120 may comprise both traffic and control signals, e.g., paging signals/messages for incoming calls, which may be used to establish and maintain a voice call communication with another party or to transmit and/or receive data, such as SMS, e-mail or MMS messages, with a remote user equipment, or the positioning node 130.

The actions 301-305 in the first network node 110 may be implemented through one or more processors 420 in the first network node 110, together with computer program code for performing the functions of the present actions 301-305. Thus a computer program product comprising instructions for performing the actions 301-305 in the arrangement 400 may perform those actions in order to achieve intercell interference coordination in the wireless communication network 100, when the computer program product is loaded into the processor 420.

The computer program product mentioned above may be provided, for instance, in the form of a data carrier carrying computer program code for performing the method actions according to the present solution when being loaded into the processor unit 420. The data carrier may be, e.g., computer readable storage medium such as a hard disk, a CD ROM disc, a memory stick, an optical storage device, a magnetic storage device or any other appropriate medium, such as a disk or tape that may hold machine readable data. The computer program code may furthermore be provided as program code on a server and downloaded to the first network node 110 remotely, e.g., over an Internet or an intranet connection.

Figure 5:
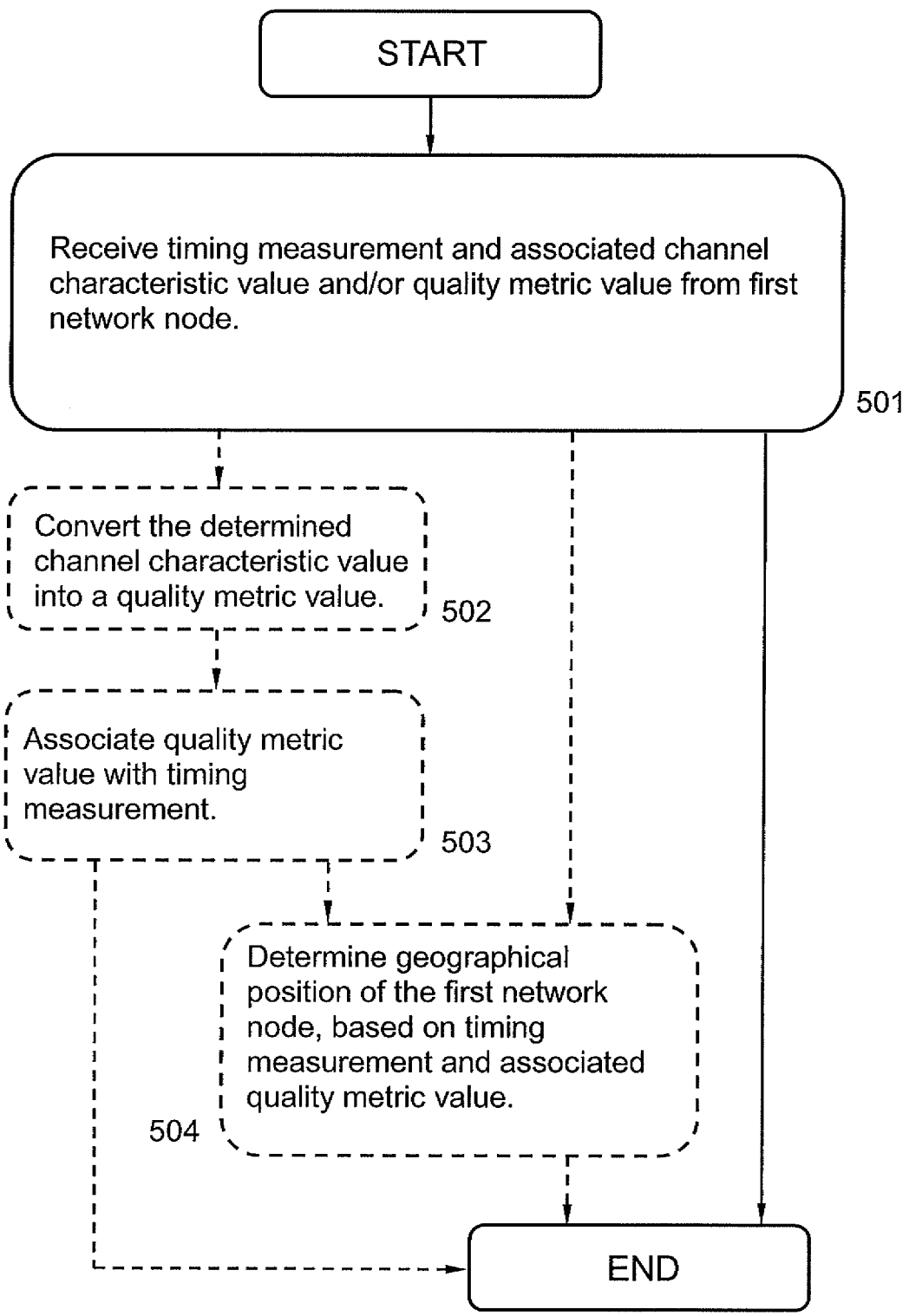
FIG. 5 is a flow chart illustrating an embodiment of the present method in a positioning node.

FIG. 5 is a flow chart illustrating embodiments of method actions 501-504 in a positioning node 130. The actions 501-504 aim at enabling quality estimation of a measurement that is time based. The positioning node 130 and a first network node 110 are comprised in a wireless communication network 100. The wireless communication network 100 may comprise an LTE network according to some embodiments. The positioning node 130 may comprise, e.g., an E-SMLC. The first network node 110 may comprise, e.g., a mobile telephone, a user equipment or a base station according to different embodiments.

To appropriately enable quality estimation of a measurement that is time based, the method may comprise a number of actions 501-504.

It is noted, however, that some of the described method actions, e.g., action 501-504, may be performed in a somewhat different chronological order than the enumeration suggests and that some of them, e.g., actions 501 and 502, may be performed simultaneously or in a rearranged chronological order. Further, some of the actions such as, e.g., actions 502, 503 and/or 504, are optional and may only be performed within some embodiments. The method may comprise the following actions:

Action 501

A timing measurement and an associated channel characteristic value and/or quality metric value are received from the first network node 110, enabling the positioning of the first network node 110, based on the received timing measurement and the associated channel characteristic value and/or quality metric value.

Action 502

This action is optional and may be performed only within some embodiments.

If the received timing measurement is associated with a value of a channel characteristic, the value of the channel characteristic may be converted into a quality metric value.

Action 503

This action is optional and may be performed only within some embodiments.

If the received timing measurement is associated with a value of a channel characteristic which has been converted into a quality metric value may the quality metric value be associated with the timing measurement.

Action 504

This action is optional and may be performed only within some embodiments.

A geographical position of the first network node 110 may be determined based on the timing measurement and the associated quality metric value.

Figure 6:
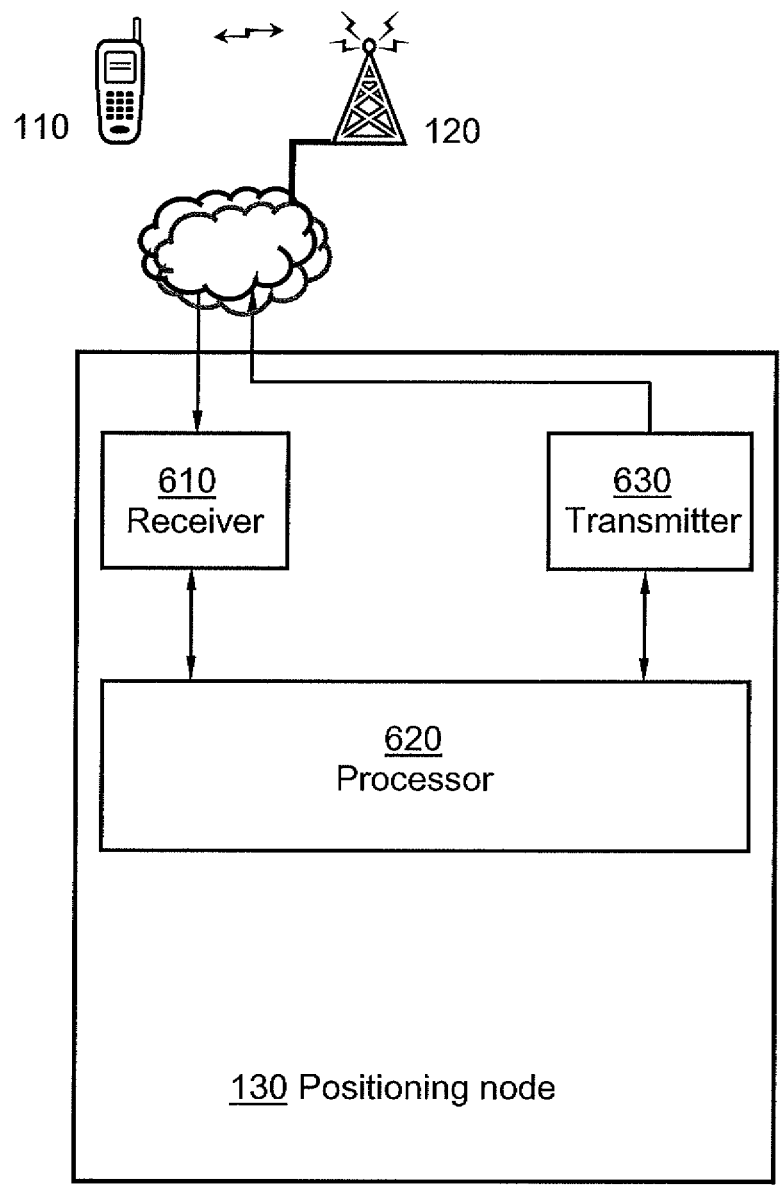
FIG. 6 is a schematic block diagram illustrating a positioning node according to some embodiments.

FIG. 6 schematically illustrates a positioning node 130. The positioning node 130 is configured to perform any, some or all of the actions 501-504 in order to enable quality estimation of a measurement that is time based. The positioning node 130 and a first network node 110 are comprised in a wireless communication network 100. The wireless communication network 100 may comprise an LTE network, according to some embodiments. The positioning node 130 may comprise, e.g., an E-SMLC. The first network node 110 may comprise, e.g., a mobile telephone, a user equipment or a base station according to different embodiments.

In order to perform the actions 501-504 correctly, the positioning node 130 comprises, e.g., a receiver 610. The receiver 610 is configured to receive a timing measurement and an associated channel characteristic value and/or quality metric value from the first network node 110. Further, the receiver 610 is configured to enable the positioning of the first network node 110 based on the received timing measurement and the associated channel characteristic value and/or quality metric value.

Further, according to some embodiments, the positioning node 130 may comprise a processor 620 that may be configured to process at least some of the above described actions 501-504 in order to achieve enable quality estimation of a measurement that is time based.

The processor 620 may be represented by, e.g., a Central Processing Unit (CPU), a microprocessor, or other processing logic that may interpret and execute instructions. The processor 620 may perform data processing functions for inputting, outputting, and processing of data including data buffering and device control functions, such as call processing control, user interface control, or the like.

Further, according to some embodiments, the positioning node 130 may comprise a transmitter 630. The transmitter 630 may be configured to transmit signals to the second network node 120, or to the first network node 110 via the second network node 120.

It is to be noted that any internal electronics of the positioning node 130 not completely necessary for understanding the present method according to actions 501-504 has been omitted from FIG. 6, for clarity reasons.

Further, it is to be noted that some of the described units 610-630 comprised within the positioning node 130 in the wireless communication network 100 are to be regarded as separate logical entities but not necessarily separate physical entities.

The actions 501-504 in the positioning node 130 may be implemented through one or more processors 620 in the positioning node 130, together with computer program code for performing the functions of the present actions 501-504. Thus a computer program product, comprising instructions for performing the actions 501-504 in the positioning node 130, may perform those actions in order to enable quality estimation of a measurement that is time based when the computer program product is loaded into the processor 620.

The computer program product mentioned above may be provided, for instance, in the form of a data carrier carrying computer program code for performing the method actions according to the present solution when being loaded into the processor 620. The data carrier may be, e.g., computer readable storage medium such as a hard disk, a CD ROM disc, a memory stick, an optical storage device, a magnetic storage device or any other appropriate medium, such as a disk or tape that may hold machine readable data. The computer program code may furthermore be provided as program code on a server and downloaded to the positioning node 130 remotely, e.g., over an Internet or an intranet connection.

Figure 7:
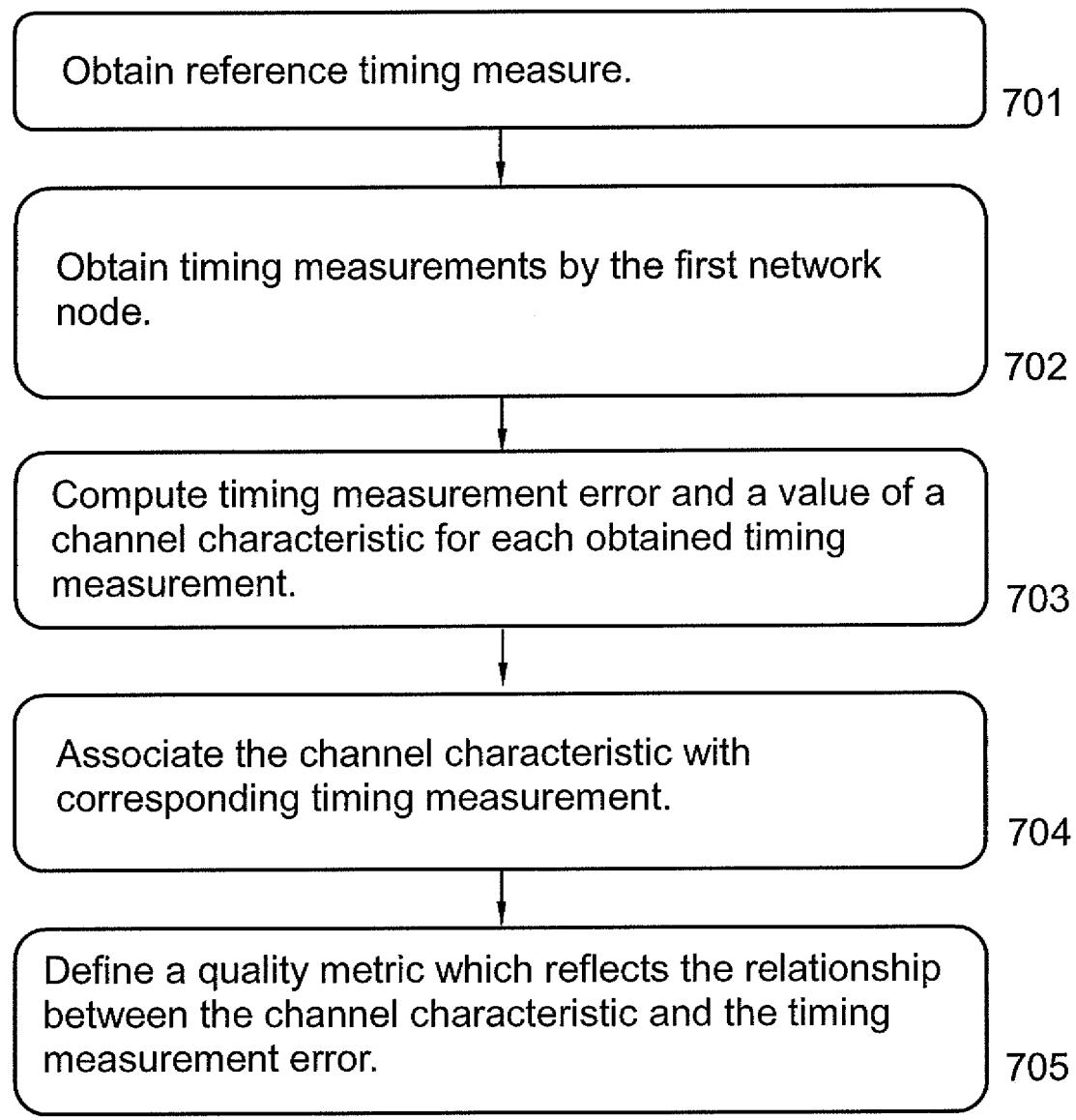
FIG. 7 is a flow chart illustrating an embodiment of the present method for obtaining a quality function according to some embodiments.

FIG. 7 is a flow chart illustrating embodiments of actions 701-705 in a module 800 in a wireless communication network 100. The module 800 may be comprised in a first network node 110, or in a positioning node 130, according to different embodiments.

The actions 701-705 aim at obtaining a quality function by relating a value of a channel characteristic with a certain quality metric value, which values are associated with a certain timing measurement.

The wireless communication network 100 comprises a first network node 110, a second network node 120, and a positioning node 130. The wireless communication network 100 may be, e.g., an LTE radio network. The first network node 110 may be, e.g., a mobile telephone, a user equipment or a base station according to different embodiments. The second network node 120 may be, e.g., a base station, an eNB, a mobile telephone, or a user equipment according to different embodiments.

To appropriately obtain a quality function by relating a value of a channel characteristic with a certain quality metric value, the method may comprise a number of actions 701-705.

It is noted, however, that some of the herein described actions, e.g., actions 701-705, may be performed in a somewhat different chronological order than the enumeration suggests and that some of them, such as, e.g., action 701 and 702, may be performed simultaneously or in a rearranged chronological order. The method may comprise the following actions:

Action 701

A reference timing measure for signals received from second network nodes 120 is obtained.

The reference timing measure may comprise measurements made on a signal received from a reference node, or a reference cell, as it also may be referred to. According to some embodiments, the reference timing measure, e.g., may be obtained as a linear function of a distance measure for the transmitting and receiving nodes, i.e., the first network node 110 and the second network nodes 120. The distance measure may, e.g., be the distance between the first network node 110 and the second network nodes 120, when, e.g., the corresponding timing measurement is time of arrival. The distance measure may also comprise the difference between two distances, the distance between the first network node 110 and the second network nodes 120 and/or the distance between the first network node 110 and another instance of the second network node 120, when the corresponding timing measurement comprises e.g., RSTD. The distance measures may, e.g., be obtained with GPS receivers according to some embodiments.

Action 702

Timing measurements made by the first network node 110 for signals transmitted by the second network nodes 120 are obtained.

Action 703

A timing measurement error and a value of a channel characteristic for each timing measurement are computed. The timing measurement error and the channel characteristic value are based on the difference between the reference timing measure and the obtained timing measurements.

Action 704

The channel characteristic is associated with the corresponding timing measurement.

In one embodiment, the relation may be given by a function. In another embodiment, the relation may be given by a mapping.

Action 705

A quality metric is a defined metric which reflects the relationship between the channel characteristic and the timing measurement error.

The quality metric may be defined as a function which reflects the relationship between the channel characteristic and the timing measurement error, where a function may, e.g., be a mathematical function, pre-defined mapping or a set of systematically tabulated values.

In one embodiment, the method of obtaining the quality function may be performed on-line in a real network 100, e.g., during a training period, by collecting and using statistics from the first network node 110, i.e., the terminal, for which accurate geographical positions are known or may be obtained, e.g., with GPS receivers. In another embodiment, the relation may be obtained by off-line fitting, e.g., by simulations or test measurements. In at least one embodiment, the timing measurement may comprise RSTD measurement for which the measurement error may be defined as a function of the difference between the measured timing difference and the distance difference where the measured timing difference may be the difference between the time of arrival measurement from the second network node 120 and the time of arrival measurement from the third node, which may be a referred to as a first reference timing measure, and where the distance difference may be the difference between the geographical distance between the second network node 120 and the first network node 110 and the geographical distance between the third and the first network node 110, which may be a referred to as a second reference timing measure.

In at least one embodiment, the described method may be performed in a module in a positioning node 130 comprised in a core network 140. In another non-limiting embodiment, the module may be an entity comprised in the first network node 110, i.e. the terminal when the terminal performs positioning of itself, e.g., corresponding to user equipment-based positioning when the terminal is a user equipment. In yet another embodiment, the terminal may also request positioning of itself and thus the positioning requesting node is an entity in the terminal. The expression "terminal" as utilized herein is to be understood as a non-limiting terminology referring to any device or node being positioned.

Thereby is a simple and straightforward two-way test of relating the correlator output to the quality metric provided, which may be used in order to improve the reliability of positioning measurements as previously described.

Figure 8:
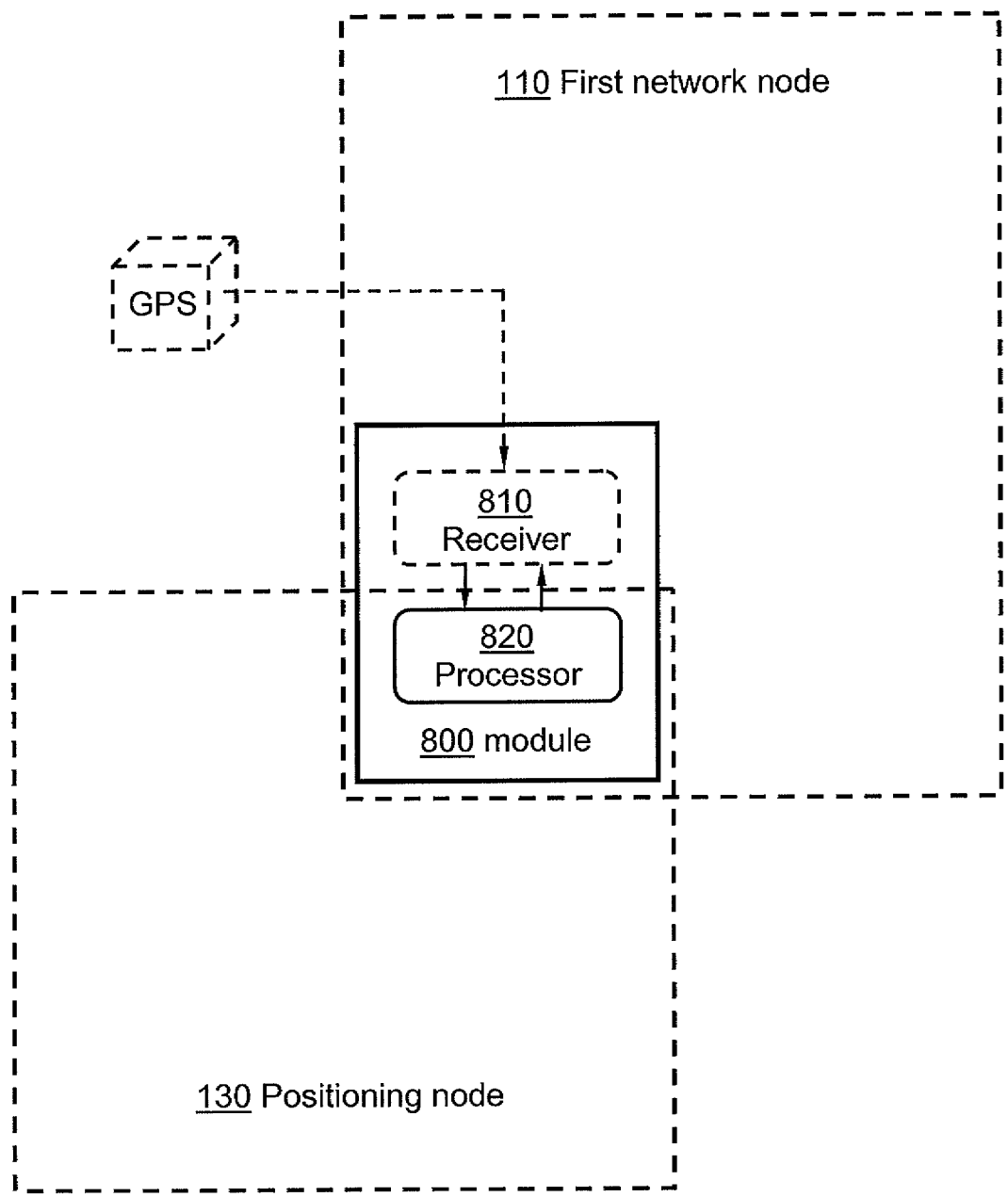
FIG. 8 is a schematic block diagram illustrating a module according to some embodiments.

FIG. 8 schematically illustrates a module 800. The module 800 is configured to perform any, some, or all of the actions 701-705 in order to obtain a quality function by relating a value of a channel characteristic with a quality metric value, which values are associated with a timing measurement. The module 800 may be comprised in the first network node 110 according to some embodiments. However, the module 800 may alternatively be comprised in the positioning node 130 according to some embodiments. The positioning node 130 and/or the first network node 110 are comprised in a wireless communication network 100. The wireless communication network 100 may comprise an LTE network according to some embodiments. The positioning node 130 may comprise, e.g., an E-SMLC. The first network node 110 may comprise, e.g., a mobile telephone, a user equipment or a base station according to different embodiments.

In order to perform the actions 701-705 correctly, the module 800 comprises a processor 820 configured to obtain a reference timing measure for signals received from second network nodes 120. Further, the processor 820 is configured to obtain timing measurements by the first network node 110 for signals transmitted by the second network nodes 120. In addition, the processor 820 is configured to compute a timing measurement error and at least one value of a channel characteristic for each obtained timing measurement, based on the difference between the reference timing measure and the obtained timing measurements. Furthermore, the processor 820 is also configured to associate the channel characteristic with the corresponding timing measurement, and to define a quality metric which reflects the relationship between the channel characteristic and the timing measurement error.

The module 800 may also optionally comprise, e.g., a receiver 810. The receiver 810 may be configured to obtain a geographical position of a first network node 110, e.g., from a GPS receiver. The optional GPS receiver may be comprised within, or connected to the first network node 110 according to some embodiments. Further, the receiver 810 may be configured to obtain the reference timing measures in the form of a distance between the first network node 110 and a second network node 120, which is transmitting signals to be measured by the first network node 110. Further, the receiver 810 may also be configured to obtain reference timing measures by the first network node 110 for signals transmitted by the second network node 120. Additionally, the receiver 810 may also be configured to obtain a timing measurement error and a value of a channel characteristic for each obtained timing measurement.

The module 800 for implementing the method according to actions 701-705 thus may comprise, or be connected to, the processor 820 that may be configured to process at least some of the above described actions 701-705 in order to obtain a quality function by relating a value of a channel characteristic with a quality metric value, which values are associated with a timing measurement.

The processor 820 may be represented by, e.g., a Central Processing Unit (CPU), a microprocessor, a processing circuit or other processing logic that may interpret and execute instructions. The processor 820 may perform data processing functions for inputting, outputting, and processing of data comprising data buffering and device control functions, such as call processing control, user interface control, or the like. Thus, the actions 701-705 may be implemented through one or more processors 820 together with computer program code for performing the functions of actions 701-705. Thus a computer program product comprising instructions for performing the actions 701-705 may perform those actions in order to obtain a quality function by relating a value of a channel characteristic with a quality metric value, which values are associated with a timing measurement, when the computer program product is loaded into the processor 820.

The computer program product mentioned above may be provided, for instance, in the form of a data carrier carrying computer program code for performing the actions 701-705 according to the present solution when being loaded into the processor 820. The data carrier may be, e.g., computer readable storage medium such as a hard disk, a CD ROM disc, a memory stick, an optical storage device, a magnetic storage device or any other appropriate medium such as a disk or tape that may hold machine readable data. The computer program code may furthermore be provided as program code on a server and downloaded remotely, e.g., over an Internet or an intranet connection.

When using the formulation "comprise" or "comprising," it is to be interpreted as non-limiting, i.e., meaning "consist at least of." The present solution is not limited to the above described preferred embodiments. Various alternatives, modifications and equivalents may be used. Therefore, the above embodiments are not to be taken as limiting the scope of claimed protection, which instead is to be defined by the appending claims.

What is claimed is:

1. In a wireless communication network including a first network node and a second network node, a method for enabling quality estimation of a measurement that is time based, the method comprising:

obtaining, by said first network node, a reference timing measure for a signal received from the second network node, wherein the reference timing measure is obtained as a function of the distance between the first network node and the second network node;

performing, by said first network node, a timing measurement based on said signal received from the second network node;
determining, by said first network node, a value of a channel characteristic for said signal received from the second network node;
computing, by said first network node, a timing measurement error based on the difference between the reference timing measure and the timing measurement;
converting the determined value of the channel characteristic into a quality metric value for the timing measurement by performing a quality function, wherein the quality function reflects the relationship between the channel characteristic and the timing measurement error, and wherein the quality function is defined as one of a polynomial function, an exponential function and a linear function; and
associating, by said first network node, the determined value of the channel characteristic and/or the quality metric value with the timing measurement, such that quality estimation of the timing measurement is enabled.

2. The method according to claim 1, wherein the timing measurement is a Reference Signal Time Difference, RSTD, measurement.

3. The method according to any of claim 1 wherein the timing measurement is based on a Positioning Reference Signal, PRS, received from at least one second network node.

4. The method according to claim 1, further comprising:
determining a geographical position of the first network node, based on the timing measurement and the associated quality metric value.

5. The method according to claim 4, wherein the quality metric value is used for determining the timing measurement weight utilized in the position calculation for the first network node.

6. The method according to claim 1, further comprising:
providing the associated values of the timing measurement and the determined channel characteristic value and/or quality metric value to a positioning node, enabling the positioning of the first network node, based on the timing measurement and the associated channel characteristic value and/or quality metric value.

7. The method according to claim 6, further comprising:
signalling at least parts of the correlation output to the positioning node.

8. The method according to claim 1, further comprising:
receiving a positioning request, triggering the timing measurement.

9. The method according to claim 2, wherein the conversion of the determined channel characteristic value into a quality metric value is performed by mapping the determined channel characteristic value against a list of predetermined corresponding quality metric values in a lookup table in a memory.

10. The method according to claim 2, wherein the conversion of the determined channel characteristic value into a quality metric value comprises performing a quality function, such as an exponential function, that relates the value of the channel characteristic to the quality metric value.

11. The method according to claim 4, wherein determining the geographical position of the first network node, based on the timing measurement and the associated quality metric value comprises:

obtaining a plurality of timing measurements, made on signals received from distinct second network nodes, each measurement associated with an also obtained quality metric value;
obtaining the corresponding set of quality metric values;
sorting the obtained timing measurements in a priority list, based on the respective associated quality metric value; and
calculating the geographical position of the first network node, based on a subset of the timing measurements selected in priority order from the priority list according to a criterion.

12. The method according to claim 11, wherein the criterion is given by a threshold and the subset of timing measurements comprises the measurements for which the quality value is on one side of the threshold.

13. The method according to any of claim 11, wherein the timing measurements with a higher quality metric value are given higher weights in the position calculation.

14. The method according to claim 1, wherein the quality estimation of a measurement that is time based further comprises the uncertainty of the measurement at a given confidence level.

15. The method according to claim 1, wherein the first network node comprises a user equipment and the second network node comprises a base station.

16. The method according to claim 2, wherein for each reported RSTD value and a given confidence level, there may be one reported value for estimated RSTD quality obtained by applying the same statistics operation as the one used to obtain the RSTD values.

17. The method according to claim 1, wherein the quality estimation of a measurement that is time based is associated with a specific positioning Quality of Service, QoS.

18. A first network node for enabling quality estimation of a measurement that is time based, where the first network node and a second network node are comprised in a wireless communication network, the first network node comprising:
a receiver to receive signals from a second network node;
a processor configured to:
obtain a reference timing measure for said signals received from the second network node, wherein the reference timing measure is obtained as a function of the distance between the first network node and the second network node;
perform a timing measurement based on said signals received from the second network node;
determine a value of a channel characteristic for said signals received from the second network node;
compute a timing measurement error based on the difference between the reference timing measure and the timing measurement;
convert the determined value of the channel characteristic into a quality metric value for the timing measurement by performing a quality function, wherein the quality function reflects the relationship between the channel characteristic and the timing measurement error, and wherein the quality function is defined as one of a polynomial function, an exponential function and a linear function; and
associate the determined value of the channel characteristic with the timing measurement, such that quality estimation of the timing measurement is enabled.

19. A method implemented in a module in a first network node of a wireless communication network for obtaining a quality function by relating a value of a channel characteristic with a quality metric value, which values are associated with a timing measurement, the method comprising:

obtaining a reference timing measure for signals received from second network nodes, wherein the reference timing measure is obtained as a function of the distance between the first network node and the second network nodes;

obtaining timing measurements by the first network node for said signals received from the second network nodes, computing a timing measurement error and at least one value of a channel characteristic for each obtained timing measurement, based on the difference between the reference timing measure and the obtained timing measurements;

associating the channel characteristic with the corresponding timing measurement;

defining a quality function for a quality metric, wherein the quality function reflects the relationship between the channel characteristic and the timing measurement error; and wherein the quality function is defined as one of a polynomial function, an exponential function and a linear function.

20. A module in a first network node of a wireless communication network for obtaining a quality function by relating a value of a channel characteristic with a quality metric value, which values are associated with a timing measurement, the module comprising:

a receiver to receive signals from second network nodes;

a processor configured to:

obtain a reference timing measure for said signals received from the second network nodes, wherein the reference timing measure is obtained as a function of the distance between the first network node and the second network nodes;

obtain timing measurements by the first network node for said signals received from the second network nodes;

compute a timing measurement error and at least one value of a channel characteristic for each obtained timing measurement, based on the difference between the reference timing measure and the obtained timing measurements;

associate the channel characteristic with the corresponding timing measurement, and to define a quality function for a quality metric, wherein the quality function reflects the relationship between the channel characteristic and the timing measurement error; and wherein the quality function is defined as one of a polynomial function, an exponential function and a linear function.

* * * * *